(12) United States Patent
Matsumoto et al.

(10) Patent No.: US 11,384,675 B2
(45) Date of Patent: Jul. 12, 2022

(54) CONTROL APPARATUS

(71) Applicants: DENSO CORPORATION, Kariya (JP); MAZDA MOTOR CORPORATION, Hiroshima-pref. (JP)

(72) Inventors: Tooru Matsumoto, Kariya (JP); Katsuhide Akimoto, Kariya (JP); Takahito Masuko, Kariya (JP); Keita Takagi, Kariya (JP); Tatsuhiro Ito, Hiroshima (JP); Yuki Sato, Hiroshima (JP); Ryo Teramoto, Hiroshima-ken. (JP); Takafumi Nishio, Otake (JP)

(73) Assignees: DENSO CORPORATION, Kariya (JP); MAZDA MOTOR CORPORATION, Hiroshima-Pref. (JP)

( * ) Notice: Subject to any disclaimer, the term of this patent is extended or adjusted under 35 U.S.C. 154(b) by 449 days.

(21) Appl. No.: 16/608,243

(22) PCT Filed: Mar. 15, 2018

(86) PCT No.: PCT/JP2018/010161
§ 371 (c)(1),
(2) Date: Oct. 25, 2019

(87) PCT Pub. No.: WO2018/198568
PCT Pub. Date: Nov. 1, 2018

(65) Prior Publication Data
US 2020/0123959 A1    Apr. 23, 2020

(30) Foreign Application Priority Data

Apr. 26, 2017  (JP) .............................. JP2017-086979

(51) Int. Cl.
*F01N 11/00*  (2006.01)
*G01N 27/02*  (2006.01)
(Continued)

(52) U.S. Cl.
CPC ........... *F01N 11/007* (2013.01); *G01N 27/02* (2013.01); *G01N 27/4065* (2013.01);
(Continued)

(58) Field of Classification Search
CPC .............. G01N 27/02; G01N 27/4065; G01N 27/4163; F01N 11/007; F01N 2560/02; F01N 2560/025
See application file for complete search history.

(56) References Cited

U.S. PATENT DOCUMENTS

2004/0089545 A1  5/2004 Kawase et al.
2004/0099041 A1  5/2004 Hattori
(Continued)

*Primary Examiner* — Luan V Van
*Assistant Examiner* — Caitlyn Mingyun Sun
(74) *Attorney, Agent, or Firm* — Nixon & Vanderhye P.C.

(57) ABSTRACT

The control section of a control apparatus executes a first control for operating a voltage application section such as to cause a current to flow in a first direction through a gas sensor in a first period, and a second control for operating the voltage application section such as to cause a current to flow in a second direction, opposite to the first direction, through the gas sensor in a second period. The control apparatus changes the length of at least one of the first period and the second period based on a comparison between a first measurement value, which is the absolute value of a value measured by a sweep measurement section during execution of the first control, and a second measurement value, which is the absolute value of a value measured by the sweep measurement section during execution of the second control.

16 Claims, 24 Drawing Sheets

(51) Int. Cl.
*G01N 27/416* (2006.01)
*G01N 27/406* (2006.01)
*G01N 27/62* (2021.01)
*G05B 23/02* (2006.01)

(52) U.S. Cl.
CPC ......... *G01N 27/4163* (2013.01); *G01N 27/62* (2013.01); *G05B 23/0205* (2013.01); *G01N 27/4162* (2013.01); *G05B 2219/2637* (2013.01)

(56) References Cited

U.S. PATENT DOCUMENTS

2015/0268299 A1* 9/2015 Umeno ................. F01N 11/007
 324/537
2015/0323493 A1* 11/2015 Uemura ............. G01N 27/4175
 204/406

* cited by examiner

CONTROL APPARATUS

CROSS-REFERENCE TO RELATED APPLICATIONS

This application is the U.S. national phase of International Application No. PCT/JP2018/010161 filed Mar. 15, 2018 which designated the U.S. and claims the benefit of priority from Japanese Patent Application No. 2017-086979, filed Apr. 26, 2017, the entire disclosure of which is incorporated herein by reference.

TECHNICAL FIELD

The present disclosure relates to a control apparatus for a gas sensor that measures a gas concentration.

BACKGROUND ART

A gas sensor is provided in the exhaust gas passage of a vehicle having an internal combustion engine, for measuring the concentration of a specific gas (for example, oxygen) that is contained in the exhaust gas. In the same manner as for an $O_2$ sensor or an A/F sensor, a sensor for measuring the oxygen concentration has a solid oxide layer through which oxygen ions can pass, and is configured such as to vary the resulting electromagnetic force in accordance with the oxygen concentration within a detection space.

In order to accurately measure the gas concentration by the gas sensor, it is necessary to maintain the temperature of the gas sensor within an activation temperature range. Since this activation temperature range is relatively narrow, it is difficult to maintain the temperature of the gas sensor within that range through heating the gas sensor only by the exhaust gas. For that reason, the gas sensor is generally provided with a heater, and the temperature of the gas sensor is adjusted to be held within the activation temperature range by energizing the heater.

It would be possible to provide a separate temperature sensor for measuring the temperature of the gas sensor, to perform temperature adjustment as described above. However, such a configuration is undesirable, in view of increased parts cost. The temperature of the gas sensor is therefore estimated by measuring its impedance, and using a correlation relationship between the temperature of the gas sensor and its impedance.

For example, with an oxygen sensor element impedance detection apparatus (that is, a control apparatus for a gas sensor) described in PTL 1 below, a sweep voltage is applied to the gas sensor, with the gas sensor in a condition in which measurement of gas concentration by the gas sensor is temporarily interrupted. The impedance of the gas sensor is then calculated by dividing the amount of increase in voltage across the gas sensor by the amount of increase in current. After calculating the impedance of the gas sensor, measurement of the gas concentration by the gas sensor is resumed.

CITATION LIST

Patent Literature

[PTL 1] JP-A-2004-177178

SUMMARY OF INVENTION

With the control apparatus described in PTL 1, after the sweep voltage is applied to the gas sensor for calculating the impedance, the sweep voltage is returned to zero and the measurement of the gas concentration is restarted. However, charge becomes accumulated in the gas sensor due to the application of the sweep voltage, and this charge is discharged from the gas sensor after the sweep voltage is returned to zero. As a result, the electromotive force which expresses the measured value of the gas sensor may be changed by the effects of such a discharge. That is, a value of electromotive force that differs from the electromotive force corresponding to the gas concentration may be produced by the gas sensor.

In order to prevent this phenomenon, a voltage which is in the reverse direction to the above sweep voltage (also referred to as a "reverse sweep voltage" in the following) is applied to the gas sensor before returning the sweep voltage to zero and resuming the measurement of the gas concentration. By applying the voltage in the reverse direction, discharge of the charge accumulated in the gas sensor can be promoted, and the above-described effects of the stored charge on the electromotive force can be suppressed.

Preferably, the absolute value of the reverse sweep voltage should be made equal to the absolute value of the sweep voltage, in order to keep the amount of charge accumulated in the gas sensor as low as possible when measurement of the gas concentration is resumed. Furthermore it is preferable to make the length of the period for which the reverse sweep voltage is applied coincide with the length of the period for which the sweep voltage is applied.

However, with a circuit for applying a sweep voltage or the like to a gas sensor, the absolute values of the sweep voltage and the reverse sweep voltage may vary, due to the parts tolerances of circuit components, and temperature variations. Thus, it is difficult to make the absolute value of the reverse sweep voltage and the absolute value of the sweep voltage exactly match each other. It is not practical, from the aspect of parts cost, to strictly control the parts tolerances or to provide some separate means for suppressing temperature variations, in order to make the absolute values of the reverse sweep voltage and the sweep voltage exactly match each other.

It is an objective of the present disclosure to provide a control apparatus which suppresses the accumulation of charge in a gas sensor that is caused by impedance measurement, and which enables a gas concentration to be accurately measured by the gas sensor.

A control apparatus according to the present disclosure serves to control a gas sensor that measures a gas concentration, and includes a voltage application section which applies a voltage to the gas sensor for measuring the impedance of the gas sensor, a control section which controls the operation of the voltage application section, and a sweep measurement section which measures the current that flows in the gas sensor, or voltage applied to the gas sensor, or both of these. The control section executes a first control, in a first period, for operating the voltage application section such that a current flows in the gas sensor in a first direction, and executes a second control, in a second period that follows the first period, for operating the voltage application section such that a current flows in the gas sensor in a second direction that is opposite the first direction, and changes the length of at least one of the first period and the second period based on a comparison between a first measurement value and a second measurement value, where the first measurement value is the absolute value of a value measured by the sweep measurement section during execution of the first control and the second measurement value is the absolute value of a value measured by the sweep measurement section during execution of the second control.

With a control apparatus having such a configuration, after a current is passed through the gas sensor in the first direction in the first period, a current is passed through the gas sensor in the second direction in the second period. Impedance measurement is performed in the first period, and the charge accumulated in the gas sensor is removed in the second period. Furthermore with the control apparatus, the length of at least one of the first period and the second period is changed based on a first measurement value and a second measurement value that are measured by the sweep measurement section.

For that reason, even if the first measurement value and the second measurement value are different from each other due to parts variations, etc., since the length of at least one of the first period and the second period is changed, the charge accumulated in the gas sensor can be held to approximately zero, so that the electromotive force is prevented from fluctuating due to accumulated charge after the impedance measurement is performed, and thus, the gas concentration can be accurately measured by the gas sensor.

The present disclosure provides a control apparatus which suppresses an accumulation of charge in a gas sensor, caused by executing impedance measurement, and enables measurement of gas concentration by the gas sensor to be accurately performed.

DESCRIPTION OF EMBODIMENTS

Figure 1:
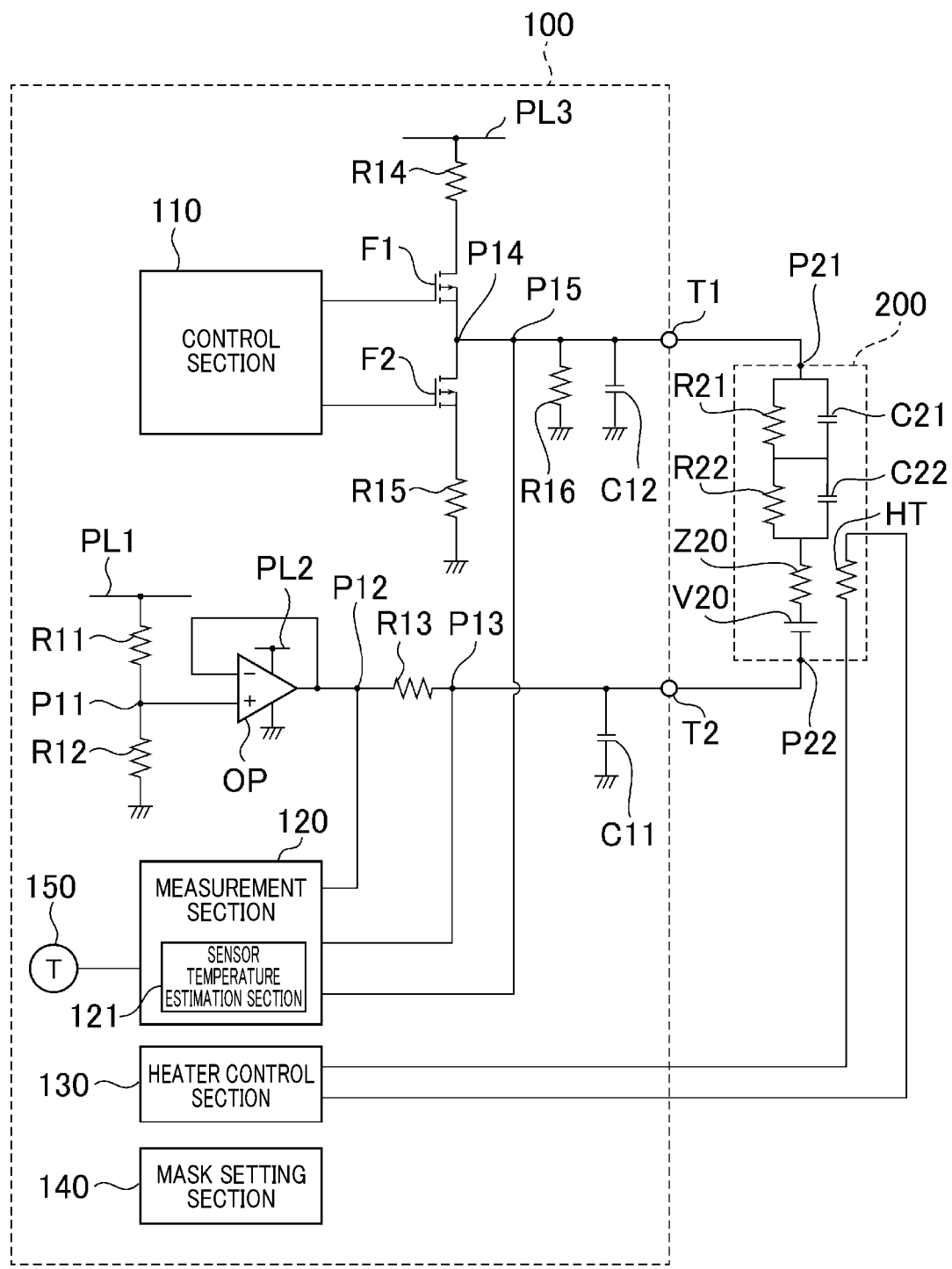
FIG. 1 is a conceptual diagram showing the configuration of a gas sensor and a control apparatus according to a first embodiment.

Embodiments will be described in the following referring to the appended drawings. For ease of understanding, constituent elements that are identical in respective drawings are designated by the same reference numerals in the drawings as far as possible, and duplicated descriptions are omitted.

The respective configurations of a control apparatus 100 and a gas sensor 200 according to the first embodiment will be described referring to FIG. 1. The gas sensor 200 is provided in an exhaust passage (not shown) of a vehicle, and is an $O_2$ sensor for measuring the oxygen concentration of the exhaust gas passing through the exhaust passage. The control apparatus 100 is an apparatus for measuring a gas concentration by means of the gas sensor 200, through application of a voltage to the gas sensor 200.

The configuration of the gas sensor 200 will first be described. The gas sensor 200 has a solid oxide layer formed of partially stabilized zirconia, and a pair of electrode layers formed on opposing sides of the solid oxide layer (both not shown). The exhaust gas flowing through the exhaust passage is fed to one of the electrode layers. Atmospheric air is passed into the other electrode layer. In the gas sensor 200, oxygen ions pass through the solid oxide layers in accordance with the difference between the oxygen concentration of the exhaust gas and the oxygen concentration of the atmosphere. An electromotive force having a magnitude corresponding to the oxygen concentration of the exhaust gas is thereby generated by the gas sensor 200.

FIG. 1 shows an equivalent circuit of the gas sensor 200 configured as described above. The resistors R21 and R22 express the respective resistance components of the layers constituting the gas sensor 200. The capacitors C21 and C22 express the capacitance components of the layers constituting the gas sensor 200. The power source V20 conceptually expresses the generation source of the electromotive force of the gas sensor 200, that is, the electromotive force having a magnitude corresponding to the oxygen concentration of the exhaust gas. The electromotive force is approximately 1 V when the air fuel ratio of the exhaust gas is richer than the theoretical air fuel ratio, and is approximately 0 V when the air fuel ratio of the exhaust gas is leaner than the theoretical air fuel ratio. In a region where the air/fuel ratio is close to the theoretical air/fuel ratio, the above-mentioned electromotive force rapidly changes between 1 V and 0 V.

The electromotive force of the gas sensor 200 is outputted to the control apparatus 100 as a potential difference between the end P21 at one side of the gas sensor 200 and the end P22 at the other side. The end P21 is connected to the terminal T1 of the control apparatus 100. The end P22 is connected to a terminal T2 of the control apparatus 100.

To measure the oxygen concentration accurately by the gas sensor 200, it is necessary to keep the temperature of the gas sensor 200 (specifically, the temperature of the solid oxide layer) within an activation temperature range. Since this activation temperature range is relatively narrow, it is difficult to keep the temperature of the gas sensor 200 within the activation temperature range only through heating the gas sensor 200 by the exhaust gas. A heater HT is therefore provided for heating the gas sensor 200. The temperature of the gas sensor 200 is adjusted to be within the above-mentioned activation temperature range by controlling the magnitude of a current that is supplied to the heater HT.

For the control apparatus 100 to perform temperature control as described above, it is necessary for the control apparatus 100 to ascertain the temperature of the gas sensor 200. A temperature sensor could be provided separately for measuring the temperature of the gas sensor 200. However, such a configuration is undesirable, from the aspect of an increase in parts cost.

For that reason, the control apparatus 100 of the present embodiment periodically measures the impedance of the gas sensor 200 (specifically, the impedance of the solid oxide layer), and estimates the temperature of the gas sensor 200 based on the impedance. A resistor Z20 shown in the equivalent circuit of FIG. 1 expresses the impedance of the gas sensor 200.

Figure 22:
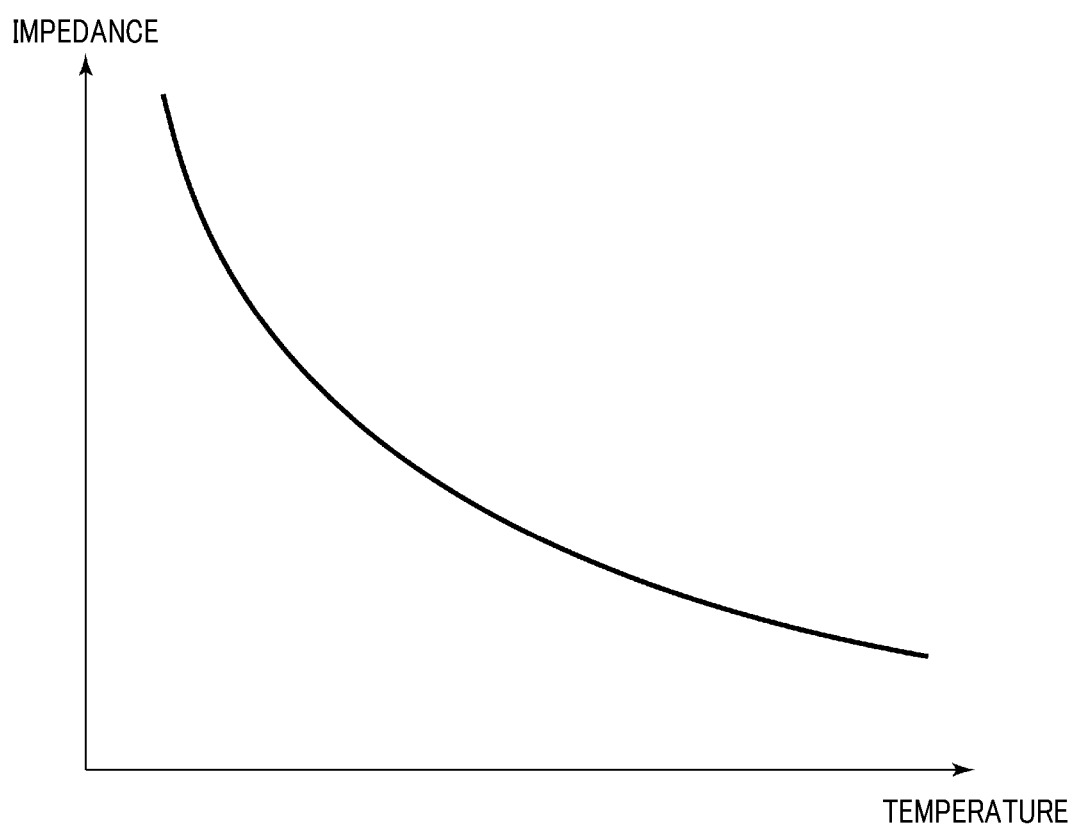
FIG. 22 is a diagram showing a relationship between the temperature and impedance of a gas sensor.

FIG. 22 shows the relationship between the temperature of the gas sensor 200 and the impedance. As shown in the diagram, the higher the temperature of the gas sensor 200, the smaller the impedance of the gas sensor 200 tends to become. The correspondence relationship shown in FIG. 22 is measured beforehand and stored in a storage device (not shown) of the control apparatus 100. The control apparatus 100 estimates the temperature of the gas sensor 200 based on its impedance and on the correspondence relationship shown in FIG. 22, with the impedance of the gas sensor 200 being measured by a method described hereinafter. The control apparatus 100 adjusts the duty ratio of the voltage applied to the heater HT based on the estimated temperature of the gas sensor 200.

The configuration of the control apparatus 100 will be described in the following, continuing to refer to FIG. 1. The control apparatus 100 is provided with power supply lines PL1 and PL2. The power supply line PL1 is a constant voltage source for applying a predetermined amount of positive-polarity offset to the end P22 of the gas sensor 200, with respect to ground potential. The power supply line PL2 is a constant voltage source for supplying operating power to the operational amplifier OP.

A resistor R11 and the resistor R12 are connected in series between the power supply line PL1 and the ground line. A point P11 between the resistor R11 and the resistor R12 is connected to the non-inverting input of the operational amplifier OP.

The output of the operational amplifier OP is connected to the end P22 of the gas sensor 200 via a resistor R13 and the terminal T2. A capacitor C11 is connected between the ground line and an intermediate position on the lead extending from the output of the operational amplifier OP.

The lead extending from the output of the operational amplifier OP is branched at an intermediate position, with a branch lead being connected to the inverting input of the operational amplifier OP. As a result, when measurement of the oxygen concentration by the gas sensor 200 is performed, the potential of the end P22 of the gas sensor 200 is maintained at the same potential as that of the point P11 (2 V, with the present embodiment). The potential of the end P21 of the gas sensor 200 is obtained by adding the electromotive force of the gas sensor 200 to the potential of the end P22. Thus, the gas sensor 200 changes the potential of the end P22 in accordance with the oxygen concentration. The potential of the end P22 changes between approximately 2 V and 3 V, depending on the oxygen concentration of the exhaust gas.

The control apparatus 100 is provided with a power supply line PL3 in addition to power supply lines PL1 and PL2. The power supply line PL3 is a constant voltage source which is provided for applying a sweep voltage, described hereinafter, to the gas sensor 200 when measuring its impedance. A resistor R14, a switching element F1, a switching element F2, and a resistor R15 are connected in series, in that order, between the power supply line PL3 and the ground line.

The switching elements F1 and F2 are both field effect transistors (FETs). The switching operations of the switching elements F1 and F2 are individually controlled by an operation control section (hereinafter referred to as a "control section") 110, described hereinafter.

A point P14 between the switching element F1 and the switching element F2 is connected to the end P21 of the gas sensor 200 via the terminal T1. A resistor R16 and a capacitor C12 are connected in parallel between a ground line and an intermediate position on the line connecting the point P14 to the terminal T1.

When measurement of the oxygen concentration by the gas sensor 200 is performed, both of the switching elements F1 and F2 are in the open state. The potential at the point P14 is therefore equal to the potential at the end P22 plus the electromotive force of the gas sensor 200, and is not affected by the power supply line PL3.

As described hereinafter, when the impedance of the gas sensor 200 is measured, control is applied for opening and closing the switching element F1 at a predetermined duty ratio, while maintaining the switching element F2 open. As a result, a voltage is applied to the gas sensor 200 in a direction from the end P21 toward the end P22 (hereinafter, this direction is also referred to as the "first direction").

Immediately after measurement of the impedance of the gas sensor 200 has been performed, the switching element F1 is returned to the open state, and control is applied for opening and closing the switching element F2 with a predetermined duty ratio. As a result, a voltage is applied to the gas sensor 200 in a direction from the end P22 toward the end P21 (hereinafter, this direction is also referred to as the "second direction").

The switching elements F1 and F2 that perform the above operation can be considered as parts that apply a voltage to the gas sensor 200 for measuring its impedance. Such switching elements F1 and F2 correspond to a "voltage application device" in the present embodiment.

The control apparatus 100 further includes a control section 110, a measurement section 120, a heater control section 130, and a mask setting section 140. Each of these is configured as an individual IC. However, the specific configurations of the control section 110, etc., are not limited to those described above. For example, the control section 110, the measurement section 120, and the heater control section 130 may be configured as a single IC. In addition, any one of the control section 110, etc., may be configured as a combination of a plurality of ICs, instead of a single IC.

The control section 110 transmits control signals to each of the switching elements F1 and F2 which are voltage application units, for thereby individually controlling their opening/closing operation.

The measurement section 120 measures the current flowing to the gas sensor 200, the voltage applied to the gas sensor 200, etc. As shown in FIG. 1, the measurement section 120 receives the potential appearing at the point P12, between the resistor R13 and the operational amplifier OP and the potential appearing at the point P13, between the resistor R13 and the end P22. The measuring section 120 can measure (calculate) the magnitude of current flowing through the resistor R13, that is, the current flowing through the gas sensor 200, based on the potential difference between the points P12 and P13.

The measuring section 120 also receives the potential appearing at the point P15, between the point P14 and the end P21. The measuring section 120 can measure the potential difference between the ends P21 and P22 of the gas sensor 200 based on the potential difference between the points P15 and P13.

When both of the switching elements F1 and F2 are open and measurement of the oxygen concentration by the gas sensor 200 is performed, the potential difference between the point P15 and the point P13 is equal to the electromotive force of the gas sensor 200. The measurement section 120 can calculate the current value of oxygen concentration in the exhaust gas based on the electromotive force of the gas sensor 200.

As described hereinafter, the measurement section 120 has a function of calculating the impedance of the gas sensor 200 based on the amount of change in the voltage (the potential difference between the points P15 and P13) applied to the gas sensor 200 and the amount of change in the current flowing through the gas sensor 200.

The measurement section 120 includes a sensor temperature estimation section 121 as a functional control block. The sensor temperature estimation section 121 is a part that estimates the current temperature of the gas sensor 200 based on the impedance of the gas sensor 200 and the correspondence relationship that is shown in FIG. 22.

In addition to the potentials of the point P12 etc., as described above, the measurement section 120 also receives the measurement value of a temperature sensor 150. The temperature sensor 150 is provided for measuring the temperature of the control apparatus 100 during operation, and corresponds to a "temperature measurement section" in the present embodiment. In the control apparatus 100, the location at which the temperature is measured by the temperature sensor 150 is preferably close to the resistor R14 or the resistor R15.

The heater control section 130 supplies current to the heater HT of the gas sensor 200. The heater control section 130 adjusts the duty ratio of the voltage applied to the heater HT such that that the temperature of the gas sensor 200 estimated by the sensor temperature estimation section 121 (that is, the temperature which is estimated based on the impedance of the gas sensor 200) is maintained within the activation temperature range.

The mask setting section 140 sets a mask period TM10. The mask period TM10 is described hereinafter.

Figure 2:
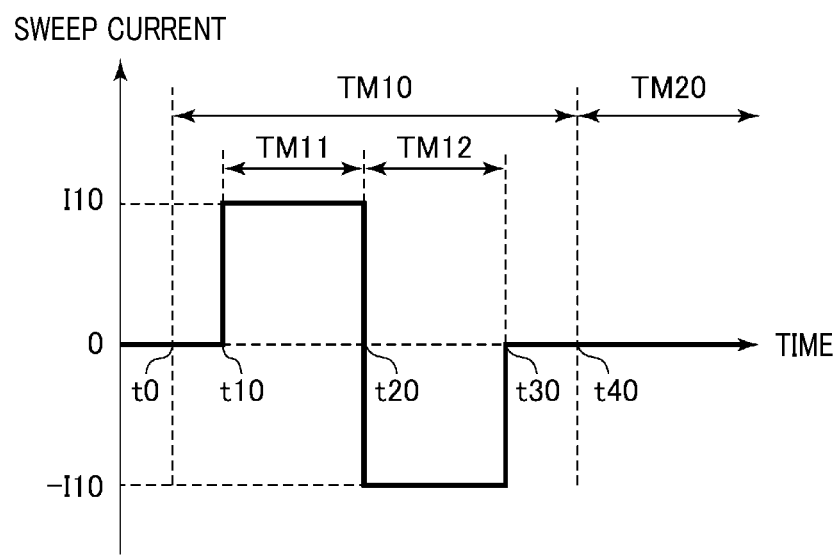
FIG. 2 is a diagram showing the variation with time of a sweep current that flows in the gas sensor when impedance measurement is performed.

An outline of processing performed by the control apparatus 100 to measure the impedance of the gas sensor 200 will be described referring to FIG. 2. As described above, when impedance measurement is performed, a voltage is applied to the gas sensor 200 in the first direction, causing a current to flow in the gas sensor 200. In the following description, the voltage applied to the gas sensor 200 is also referred to as "sweep voltage", and the current flowing through the gas sensor 200 is also referred to as "sweep current". Furthermore with respect to positive and negative values of a sweep voltage and a sweep current, the first direction is designated as positive and the second direction is designated as negative, for either of sweep voltage and a sweep current. FIG. 2 shows the variation with time of the sweep current (actually, the current flowing through the resistor R13) measured by the measurement section 120.

While the impedance of the gas sensor 200 is being measured, measurement of the oxygen concentration by the gas sensor 200 cannot be performed. The control apparatus 100 therefore sets a mask period TM10, as a period in which the measurement of the oxygen concentration is temporarily inhibited, and measures the impedance during the mask period TM10. In the example of FIG. 2, the period from time point t0 to time point t40 is set as the mask period TM10. The setting of the mask period TM10 is performed by the mask setting section 140.

When the mask period TM10 ends, measurement of the oxygen concentration by the gas sensor 200 is resumed. Hereinafter, a period in which measurement of the oxygen concentration by the gas sensor 200 is performed, that is, a period other than a mask period TM10 is also referred to as a "concentration measurement period TM20".

The setting of the mask period TM10 and the measurement of the impedance in the mask period TM10 are repeated each time a predetermined period elapses. Thus, the mask period TM10 and the concentration measurement period TM20 are alternately repeated.

At time point t10 immediately after the mask period TM10 starts, the control section 110 begins to open/close the switching element F1 at a predetermined duty ratio, while holding the switching element F2 open. A sweep voltage is thereby applied to the gas sensor 200 in the first direction, from the end P21 toward the end P22. The above duty ratio is preset such that the magnitude of the sweep current flowing through the gas sensor 200 matches a predetermined target value (I10). Thus, in the example of FIG. 2, the magnitude of the sweep current after time point t10 is I10. The state in which a sweep voltage in the first direction is applied to gas sensor 200 continues for a predetermined first period TM11.

The control of applying the sweep voltage to the gas sensor 200 in the first period TM11 can be considered as control of operating the switching element F1, which is a voltage application device, so that a current flows in the gas sensor 200 in the first direction. That control is also referred to as "first control" in the following.

In the first period TM11, the measurement section 120 calculates the impedance of the gas sensor 200 by dividing the amount of increase of the sweep voltage by the amount of increase of the sweep current. The amount of increase of the sweep voltage and the amount of increase of the sweep current are both measured by the measurement section 120.

It might be considered that the measurement of the oxygen concentration by the gas sensor 200 could be resumed immediately after the calculation of the impedance has been completed and the first period TM11 has ended. However, in the gas sensor 200 at the end of the first period TM11, charge has become accumulated (that is, charged) by application of the sweep voltage. Thus, after the first period TM11 ends and the sweep voltage is returned to 0, the charge is discharged from the gas sensor 200 for a relatively long time. As a result, the electromotive force indicating the measurement value of the gas sensor 200 may temporarily change due to the effects of the discharge, as described above. Thus, an electromotive force different from the electromotive force corresponding to the gas concentration may be produced from the gas sensor 200.

Thus, with the control apparatus 100 of the present embodiment, after time point t20 when the first period TM11 ends, the switching element F1 is returned to the open state and the switching element F2 starts to open/close at a predetermined duty ratio. As a result, the sweep voltage is applied to the gas sensor 200 in the second direction, from the end P22 toward the end P21. Discharging of the charge from the gas sensor 200 is thereby promoted.

The above duty ratio is set beforehand such that the magnitude of the sweep current flowing through the gas sensor 200 matches a predetermined target value (−I10). Thus, with the example of FIG. 2, the magnitude of the sweep current after time point t20 is −I10. The state in which the sweep voltage is applied to gas sensor 200 in the second direction is continued for a predetermined second period TM12. In the example of FIG. 2, the period from time point t20 to time point t30 is the second period TM12. The mask setting section 140 sets the mask period TM10 in which the measurement of the gas concentration is temporarily prohibited, as a period that includes both the first period TM11 and the second period TM12.

In the second period TM12, the control of applying the sweep voltage to the gas sensor 200 controls the operation of the switching element F2, which is a voltage application device, such that a current flows in the gas sensor 200 in the second direction, opposite to the first direction. That control is also referred to as the "second control" in the following.

The absolute value of the target value (I10) of the sweep current flowing through the gas sensor 200 in the first control and the absolute value of the target value (−I10) of the sweep current flowing through the gas sensor 200 in the second control are equal to one another. In other words, the duty ratio during the switching operation of the switching elements F1 and F2 is preset such that the absolute value of the sweep current in the first control and the absolute value of the sweep current in the second control become equal to each other.

Furthermore, the length of the first period TM11 in which the first control is performed and the length of the second period TM12 in which the second control is performed are basically identical. As a result, the amount of charge accumulated in the gas sensor 200 in the first period TM11 and the amount of charge released from the gas sensor 200 in the second period TM12 substantially coincide with each other. Thus, at the time when the measurement of the oxygen concentration by the gas sensor 200 is restarted (time point t40), the charge has almost no effect on the electromotive force of the gas sensor 200.

The mask period TM10 in which the sweep voltage is applied as described above is set repetitively, as described previously. Thus, with the control apparatus 100, the application of the sweep voltage by the switching element F1 or the like (voltage application device) and the measurement of the sweep current by the measurement section 120 are performed repetitively.

However, if the resistance of the resistor R14 deviates from the design value, due to component tolerance or temperature variation, for example, the value of the sweep current in the first period TM11 may become different from the target value I10. Similarly, the value of the sweep current in the second period TM12 may become different from the target value −I10.

Figure 23:
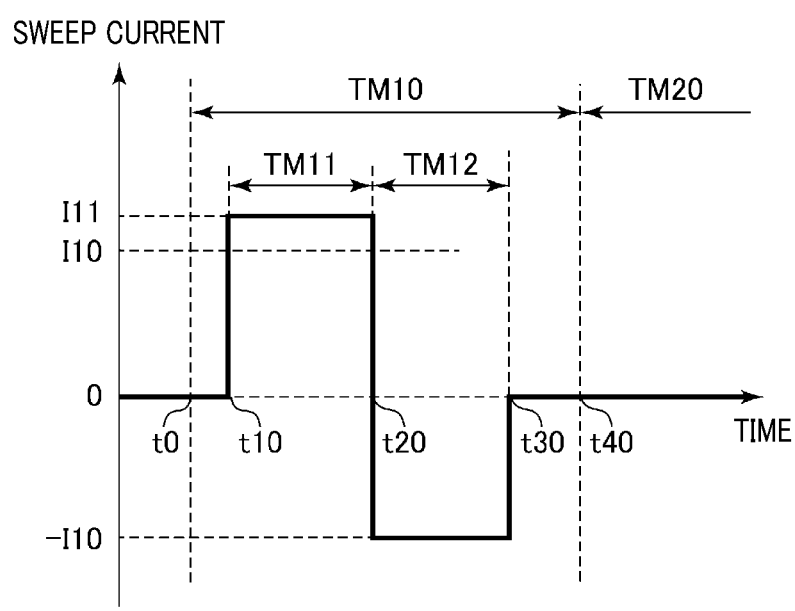
FIG. 23 is a diagram showing the variation with time of a sweep current that flows in the gas sensor, when impedance measurement is executed by a control apparatus according to a comparison example.

FIG. 23 shows an example of the variation of the sweep current with time in which the application of the sweep voltage to the gas sensor 200 is performed by a control apparatus according to the comparison example. In the example of FIG. 23, the value of the sweep current in the first period TM11 has attained a value (I11) that is higher than the target value (I10), due to the effect of component variations. On the other hand, the value of the sweep current in the first period TM11 matches the target value 410. Furthermore in the example of FIG. 23, the length of the first period TM11 and the length of the second period TM12 are equal to each other.

When the sweep voltage is applied as shown in FIG. 23, the amount of charge accumulated in the gas sensor 200 in the first period TM11 is greater than the amount of charge released from the gas sensor 200 in the second period TM12. Thus, at time point t40, when the concentration measurement period TM20 begins and measurement of the gas concentration is started, the electromotive force of the gas sensor 200 is shifted to the positive side, due to the effect of the residual charge, thus becoming different from the electromotive force that corresponds to the oxygen concentration.

Figure 24:
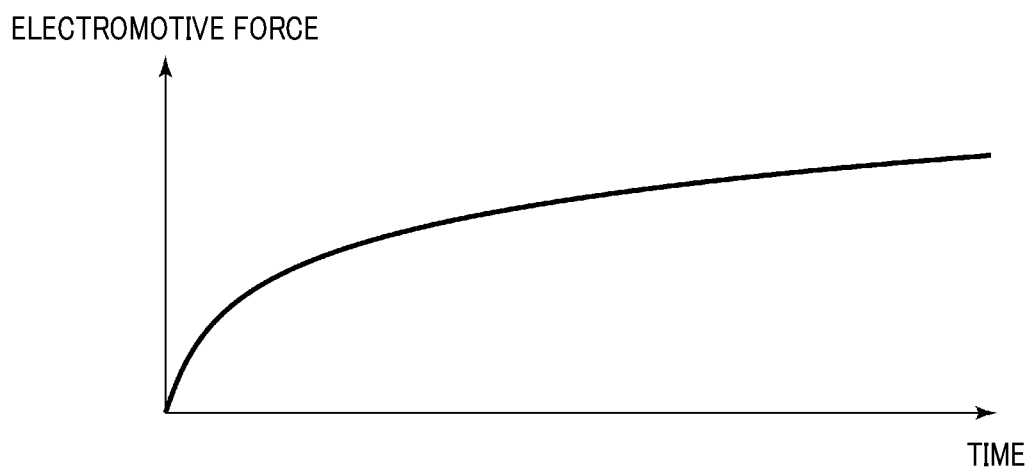
FIG. 24 is a diagram showing the variation with time of the electromotive force of a gas sensor, when impedance measurement is executed by a control apparatus according to the comparison example.

Furthermore, when the application of the sweep voltage as shown in FIG. 23 is repetitively executed, the amount of charge accumulated in the gas sensor 200 gradually increases, and as shown in FIG. 24, the electromotive force of the gas sensor 200 also gradually increases. Thus, as time passes, the difference between the actually measured electromotive force of the gas sensor 200 and the electromotive force (0 V in the example of FIG. 24) corresponding to the oxygen concentration becomes increased.

In order to prevent such deviation of the electromotive force, the control apparatus 100 of the present embodiment changes the length of at least one of the first period TM11 and the second period TM12. A specific example of this will be described referring to FIG. 3.

As with FIG. 2 described above, in FIG. 3, (A) shows the variation of sweep current with time for the case in which the respective target values (I10 and −I10) of sweep current in the first period TM11 and in the second period TM12 coincide.

At time point t191 the control apparatus 100 measures the value of the sweep current which actually flows through the gas sensor 200 in the first period TM11, in which the first control is performed, with the measurement being performed by means of the measuring section 120. The time point t191 is predetermined as the time at which a prescribed period (which is shorter than the first period TM11) has elapsed from the time point t10 when the first period TM11 commenced. The absolute value of the sweep current measured by the measurement section 120 in the first period TM11 is hereinafter also referred to as the "first measured value".

At time point t291 the control apparatus 100 measures the value of the sweep current which actually flows through the gas sensor 200 in the second period TM12, in which the second control is performed, with the measurement being performed by means of the measuring section 120. The time point t291 is predetermined as the time at which a prescribed period (which is shorter than the second period TM12) has elapsed from the time point t20 when the second first period TM12 commenced. The absolute value of the sweep current measured by the measurement section 120 in the second period TM12 is hereinafter also referred to as the "second measured value".

Similarly to the example of FIG. 23 described above, in FIG. 3, (B) shows the variation of sweep current with time for the case in which the value of the sweep current in the first period TM11 becomes I11, which is higher than the target value I10. In the example of (B) in FIG. 3, the first measurement value (I11) is greater than the second measurement value (I10).

Figure 3:
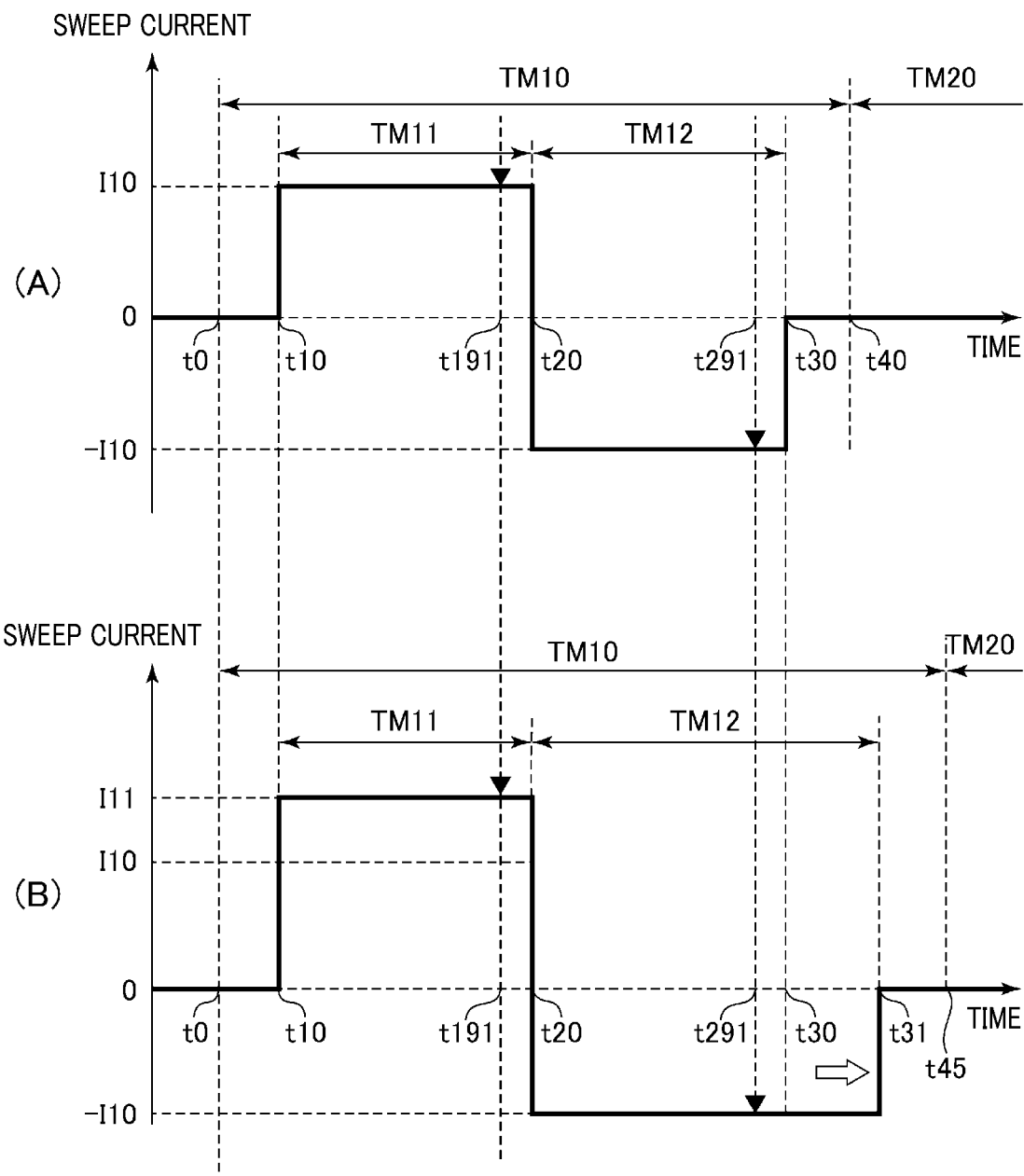
FIG. 3 is a diagram showing the variation with time of a sweep current that flows in the gas sensor when impedance measurement is performed.

If the first measurement value is greater than the second measurement value, the control section 110 of the control apparatus 100 changes the length of the second period TM12 to become longer than in the case of (A) in FIG. 3. In the example of (B) in FIG. 3, the time at which the second period TM12 ends is changed to time point t31, which occurs later than time point t30. As a result, the second period TM12 in (B) of FIG. 3 is longer than the first period TM11 in (B) of FIG. 3.

In the example of FIG. 3, after the first period TM11 is reached, there is no change between (A) and (B) in FIG. 3 in the timing at which measurement (acquisition of the first measurement value) is performed by the measurement section 120, i.e., there is no change in the length of the period from time point t10 to time point t191. In addition, after the second period TM12 is reached, there is no change between (A) and (B) in FIG. 3 in the timing at which the measurement (acquisition of the second measurement value) is performed by the measurement section 120, i.e., there is no change in the length of the period from time point t20 to time point t291.

Furthermore, in (B) of FIG. 3, the mask period TM10 is also extended together with the extension of the second period TM12. Specifically, the time at which the mask period TM10 ends is changed from time point t40 to time point t45. By performing such processing, the mask setting section 140 can prevent the measurement of the gas concentration from commencing before the time at which the second period TM12 ends.

In (B) of FIG. 3, as the second period TM12 becomes longer, the amount of charge released from the gas sensor 200 in the second period TM12 increases. Thus, not only does the charge accumulated in the gas sensor 200 in the first period TM11 increase, but also the charge released from the gas sensor 200 in the second period TM12 increases. Thus, the amount of charge accumulated in the gas sensor 200 at the time (time point t45) at which the measurement of the gas concentration is restarted can be held less than in the case of the example shown in FIG. 23. Since accumulation of charge on the gas sensor 200 in the mask period TM10 is suppressed, the gas concentration can be accurately measured by the gas sensor 200.

Furthermore, in the case in which the second measured value becomes less than I10 and as a result the first measured value becomes greater than the second measured value also, the second period TM12 is changed to become longer. In this case too, accumulation of charge on the gas sensor 200 is suppressed as described above.

Figure 4:
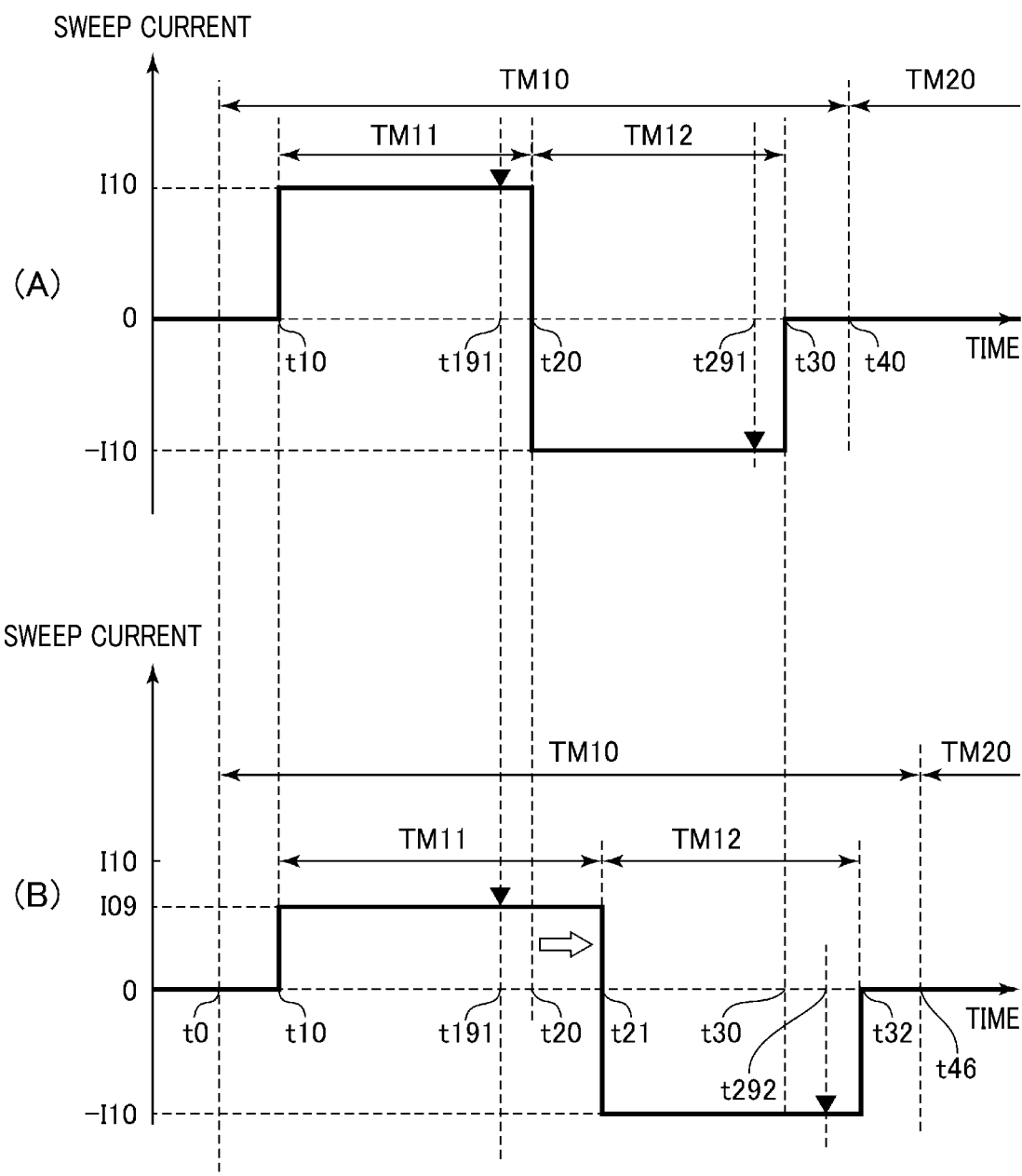
FIG. 4 is a diagram showing the variation with time of a sweep current that flows in the gas sensor when impedance measurement is performed.

Contrary to the above, an example in which the first measured value becomes less than the second measured value will be described referring to FIG. 4. In FIG. 4, (A) shows the variation of the sweep current with time, as with FIG. 2 described above, for the case in which the values of the sweep current in the first period TM11 and in the second period TM12 respectively coincide with the target values (I10 and −I10).

In FIG. 4, (B) shows the variation of the sweep current with time at which the value of the sweep current in the first period TM11 becomes I09, which is less than the target value I10. In the example of (B) in FIG. 4, the first measurement value (I09) is less than the second measurement value (I10).

If the first measurement value is less than the second measurement value, the control section 110 of the control apparatus 100 changes the length of the first period TM11 to become longer than in the case of (A) in FIG. 4. In the example of (B) in FIG. 4, the time at which the first period TM11 ends (which is also the start time of the second period TM12) is changed to time point t21, which is subsequent to t20.

Furthermore, in accordance with this, the time at which the second period TM12 ends is changed from time point t30 to time point t32. Thus, the length of the second period TM12 in (B) of FIG. 4 is the same as the length of the second period TM12 in (A) of FIG. 4.

As a result of performing the above change, the first period TM11 in (B) of FIG. 4 is longer than the second period TM12 in (B) of FIG. 4.

In (B) of FIG. 4, the time at which measurement is performed by the measurement section 120 (acquisition of the second measurement value) in the second period TM12 is changed from time point t291 to time point t292. However, the length of the period from time point t21 to time point t292 is the same as the length of the period from time point t20 to time point t291 in (A) of FIG. 4.

For that reason, in the example of FIG. 4 also, the timing at which measurement (acquisition of the second measurement value) is performed by the measurement section 120 after the second period TM12 is not changed between FIGS. 4(A) and 4(B). Furthermore, the time at which the measurement (acquisition of the first measurement value) is performed by the measurement section 120 after the first period TM11 is not changed between (A) and (B) in FIG. 4.

Moreover, in (B) of FIG. 4, together with the first period TM11 being extended, the mask period TM10 is also extended. Specifically, the time at which the mask period TM10 ends is changed from time point t40 to time point t46. By performing such processing, the mask setting section 140 can prevent the measurement of the gas concentration from being commenced prior to the end of the second period TM12.

In (B) of FIG. 4, the amount of charge accumulated per unit time in the gas sensor 200 in the first period TM11 is less than that in the case of (A) in FIG. 4. However, in (B) of FIG. 4, since the first period TM11 is long, the amount (total amount) of charge accumulated in the gas sensor 200 in the first period TM11 becomes substantially the same as in the case of (A) in FIG. 4. As a result, the difference between the amount of charge accumulated in the gas sensor 200 in the first period TM11 and the amount of charge released from the gas sensor 200 in the second period TM12 can be kept as small as in the case of (A) in FIG. 4. Since accumulation of charge on the gas sensor 200 in the mask period TM10 is suppressed, the gas concentration can be accurately measured by means of the gas sensor 200.

Furthermore if the second measured value becomes greater than I10, and as a result the first measured value becomes less than the second measured value, the first period TM11 is also changed to become longer. In this case too, accumulation of charge on the gas sensor 200 is suppressed as described above.

With the control apparatus 100 as described above, instead of preventing a difference from arising between absolute values of the sweep current depending on the direction in which the sweep voltage is applied, it is presupposed that a difference will arise, however, a decrease in measurement accuracy is prevented by adjusting the length of the first period TM11, etc. As a result, problems such as increased cost due to small parts tolerances do not arise.

It should be noted that it would be difficult to immediately execute the above-described changes in the first period TM11 and the second period TM12 during the same mask period TM10 as that in which the first measurement value and the second measurement value are acquired. Thus, instead of executing the changes in length of the first period TM11, etc., based on a comparison between the first measurement value and the second measurement value during the mask period TM10 in which the first measurement value, etc., are acquired, the control section 110 executes these changes in the next mask period TM10.

Figure 5:
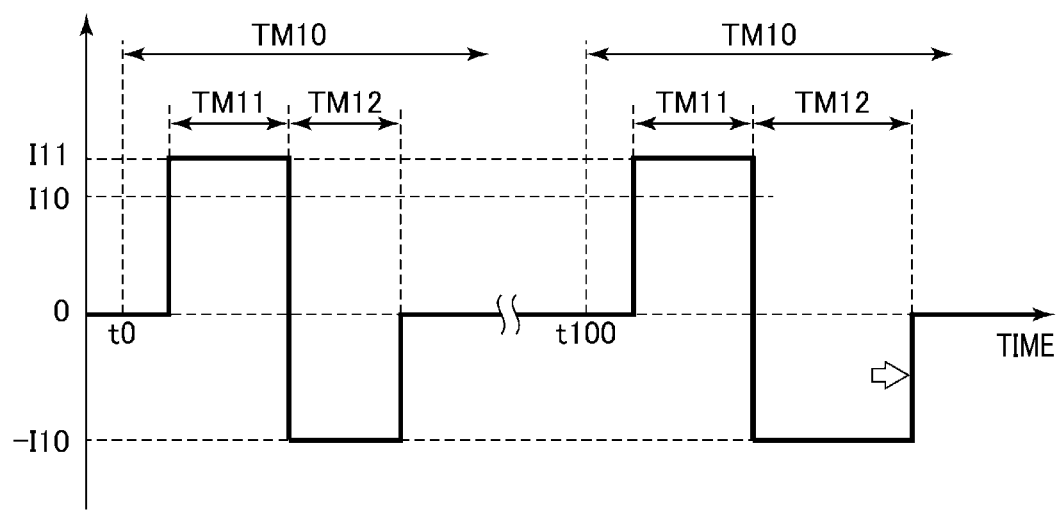
FIG. 5 is a diagram for describing a timing at which the length of a second period, etc., is changed.

With the example shown in FIG. 5, the first measurement value, which is acquired in the mask period TM10 that commences from time point t0, is greater than the second measurement value, which is measured in the same period. However, in the mask period TM10, the respective lengths of the first period TM11 and the second period TM12 are kept equal to each other.

In the next mask period TM10, which commences from time point t100, the second period TM12 is changed to become longer, based on a comparison between the first measurement value and the second measurement value that were acquired in the mask period TM10 that commenced from time point t0. In that way, based on a comparison between the first measurement value and the second measurement value that are measured in a mask period, the control section 110 changes the length of the first period TM11 or the second period TM12 in the succeeding mask period.

Furthermore the first measurement value and the second measurement value are also acquired in the mask period TM10 which commences from time point t100, and their respective lengths are compared. Based on the comparison, the length of the first period TM11 or the second period TM12 will be further changed in the succeeding mask period TM10.

As described above, with the control apparatus 100 of the present embodiment, the length of the first period TM11 or the second period TM12 is changed based on a comparison between a first measurement value and a second measurement value, where the first measurement value is the absolute value of a value measured by the measurement section 120 when a first control is being performed and the second measurement value is the absolute value of a value measured by the measurement section 120 when a second control is being performed.

The measurement section 120 that acquires the first measurement value and the second measurement value corresponds to a "sweep measurement section" in the present embodiment.

In addition to the function of acquiring the first measurement value and the second measurement value, the measurement section 120 of the present embodiment also has a function of measuring the potential, etc., of the point P15. However, instead of that, it would be equally possible to use a configuration in which the measuring section 120 has only the function of acquiring the first measurement value and second measurement value, specifically, in which the measurement section 120 has only the function of measuring the sweep current, while the other functions could be assigned to a separate IC.

In the above, an example has been described in which the lengths of the first period TM11 and the second period TM12 are changed based on the absolute value (first measured value) of the sweep current measured by the measurement section 120 in the first period TM11 and the absolute value (second measurement) of the sweep current measured by the measurement section 120 in the second period TM12. However, instead of that, it would be equally possible for the lengths of the first period TM11 and the second period TM12 to be changed based on the absolute value of the sweep voltage measured by the measurement section 120 in the first period TM11 and the absolute value of the sweep voltage measured by the measurement section 120 in the second period TM12.

That is, an aspect may be employed whereby the absolute value of the potential difference between the point P15 and the point P13 acquired in the first period TM11 is used as the first measurement value, and the absolute value of potential difference between the point P15 and the point P13 acquired in the second period TM12 is used as the second measurement value. The specific method of changing the first period TM11, etc., in that case, would be the same as that described above.

In this case, a configuration could be used in which the measurement section 120, which is the sweep measurement section, has only a function of acquiring the first measurement value and the second measurement value, specifically, a function of measuring the sweep voltage, while the other functions could be assigned to a separate IC.

The control section 110 in the present embodiment changes the lengths of the first period TM11 and the second period TM12 such that the absolute values of the time integral value of the value measured by the measurement section 120 in the first period TM11 and the time integral value of the value measured by the measurement section 120 in the second period TM12, respectively, coincide with each other.

Figure 6:
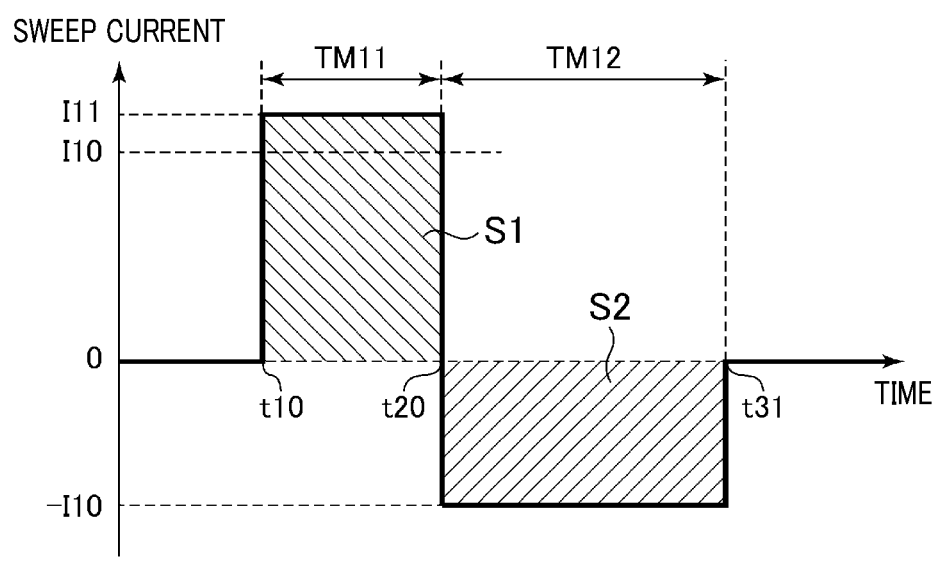
FIG. 6 is a diagram for describing a method of adjusting the length of the second period, etc.

The absolute value of the "time integral value of the value measured by the measurement section 120 in the first period TM11" corresponds to the area S1 whose absolute value is shown in FIG. 6. Such a time integral value can be calculated by multiplying the first measurement value acquired at time point t191 in FIG. 3 by the length of the first period TM11. Alternatively, to calculate the time integral value more accurately, the first measurement value may be acquired a plurality of times in the first period TM11.

The absolute value of the "time integral value of the value measured by the measurement section 120 in the second period TM12" corresponds to the area S2 shown in FIG. 6. Such a time integral value can be calculated by multiplying the second measurement value acquired at time point t291 in FIG. 3 by the length of the second period TM12. Alternatively, to calculate the time integral value more accurately, the second measurement value may be acquired a plurality of times in the second period TM12.

With the present embodiment, the absolute value of the time integral value in the first period TM11 (area S1 in FIG. 6) and the absolute value of the time integral value in the second period TM12 (area S2 in FIG. 6) are made to coincide. In that way the amount of charge accumulated in the gas sensor 200 in the first period TM11 and the amount of charge released from the gas sensor 200 in the second period TM12 can be made to almost exactly coincide. As a result, measurement of the gas concentration can be performed more accurately, since the amount of charge is close to zero at the time at which measurement of the gas concentration begins.

It should be noted that it would be equally possible for the control section 110 to change both the length of the period TM11 and also the length of the second period TM12, instead of changing the length of only one of these, to make the absolute value of the time integral value in the first period TM11 (area S1 in FIG. 6) and the absolute value of the time integral value in the second period TM12 (area S2 in FIG. 6) mutually equal.

Specific contents of processing executed by the control apparatus 100 for realizing the control described above will next be described.

Figure 7:
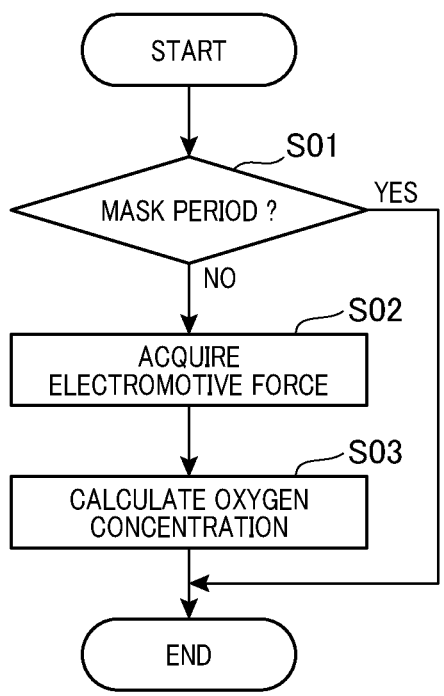
FIG. 7 is a flowchart of processing that is executed by the control apparatus of FIG. 1.

First, the processing performed to measure the oxygen concentration will be described, referring to FIG. 7. A series of processing steps shown in FIG. 7 are executed repetitively by the control apparatus 100 each time a predetermined control period elapses.

In the first step 501, a decision is made as to whether the current time is a mask period TM10. If the current time is a mask period, measurement of the gas concentration by the gas sensor 200 cannot be performed. Thus, the processing sequence shown in FIG. 7 is ended.

If the current time is not a mask period TM10, the processing proceeds to step S02. At step S02, the electromotive force of the gas sensor 200 is acquired. Specifically, the potential difference between the points P15 and P13 in FIG. 1 is acquired by the measuring section 120, as the above-mentioned electromotive force.

At step S03 following step S02, the oxygen concentration corresponding to the electromotive force is calculated, and operation control of the internal combustion engine is performed based on the oxygen concentration. In addition to the function of controlling the gas sensor 200, the control apparatus 100 in the present embodiment also has a function of controlling the operation of the internal combustion engine. Thus, the control apparatus 100 is configured as what is known as an engine ECU.

Instead of such a structure, the form may be such that the control apparatus 100 is configured as a dedicated device which controls the gas sensor 200 separately from the engine ECU. In that case, a signal indicating the calculated oxygen concentration is outputted from the control apparatus 100 to the engine ECU. Alternatively, the potential difference between the point P15 and the point P13 in FIG. 1 may be outputted to the engine ECU unchanged, as a signal indicating the oxygen concentration.

Figure 8:
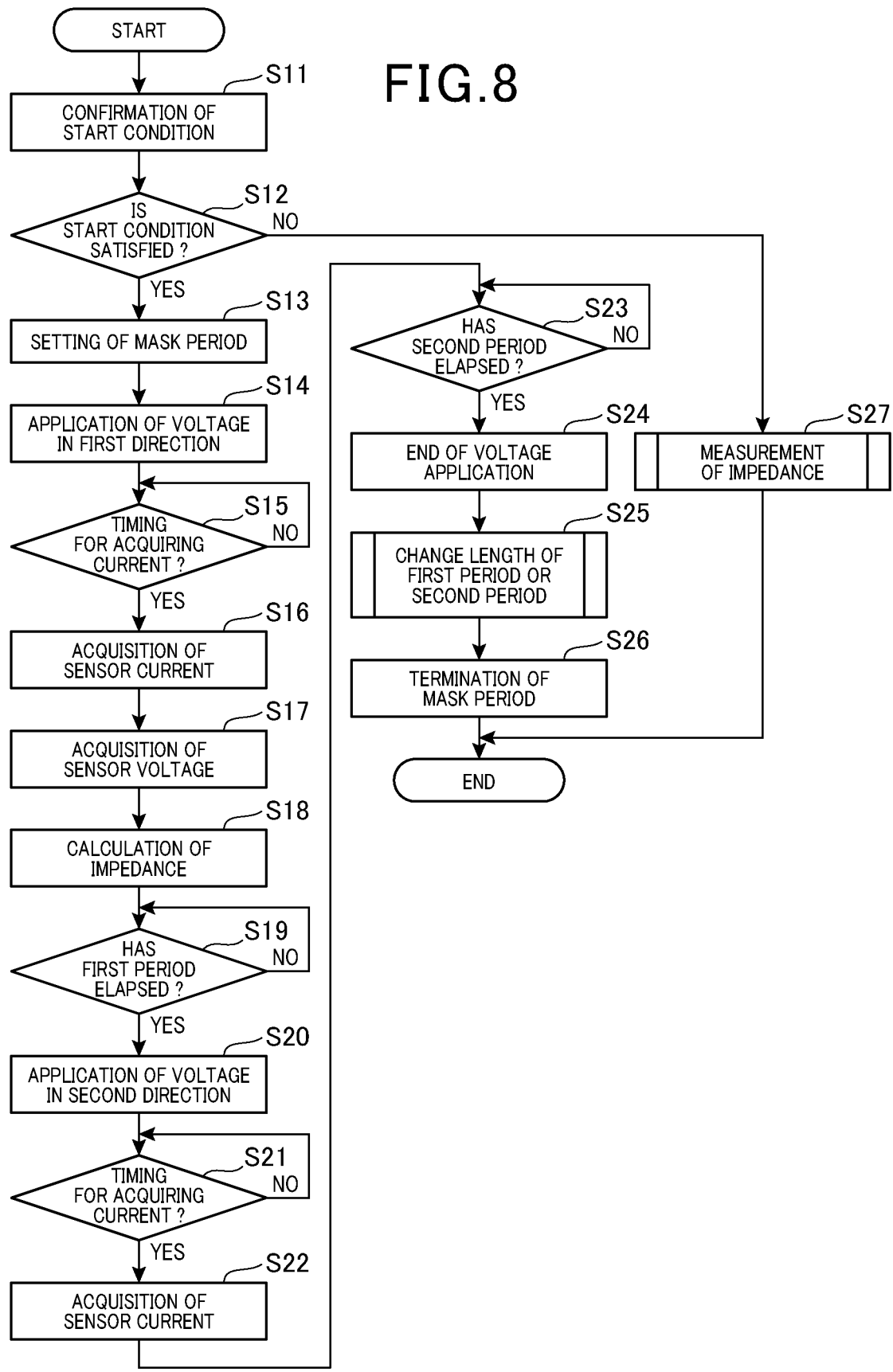
FIG. 8 is a flowchart of processing that is executed by the control apparatus of FIG. 1.

The processing performed to measure the impedance of the gas sensor 200 will be described referring to FIG. 8. The sequence of processing steps shown in FIG. 8 is executed repetitively by the control apparatus 100 each time a pre-determined control period elapses. Furthermore the processing is performed in parallel with the sequence of processing steps shown in FIG. 7.

In the first step S11, confirmation of the start condition is performed. The "start condition" is a condition that has been predetermined as being necessary for performing measurement of impedance while changing the first period TM11 and the second period TM12. Further detailed contents of the processing performed at step S11 will be described referring to FIG. 9.

At step S31, a decision is made as to whether the temperature of the gas sensor 200, estimated by the sensor temperature estimation section 121, is above a predetermined temperature. The "predetermined temperature" is a temperature that has been preset as the minimum temperature at which the gas sensor 200 can operate. If the temperature of the gas sensor 200 exceeds the predetermined temperature, as a result of heating by the heater HT, the processing proceeds to step S32. At step S32, it is judged that the start condition is satisfied.

On the other hand if the temperature of the gas sensor 200 does not exceed the predetermined temperature at step S31, the processing proceeds to step S33. At step S33, it is judged that the start condition is not satisfied.

In that way with the present embodiment, when the heater HT has been energized, and the temperature of the gas sensor 200 estimated by the sensor temperature estimation section 121 exceeds the prescribed temperature, the above start condition is set.

Thus, the control section 110 energizes the heater HT and, after the temperature estimated by the sensor temperature estimation section 121 exceeds the predetermined temperature, commences processing for changing the length of at least one of the first period TM11 and the second period TM12. As a result, a situation can be prevented whereby adjustment of the first period TM11, etc., is performed unnecessarily, although the gas concentration in the gas sensor 200 cannot yet be measured accurately.

The description will be continued, returning to FIG. 8. At step S12 following step S11, a decision is made as to whether the start condition was satisfied at step S11. If the start condition is not satisfied, the processing proceeds to step S27.

At step S27, the impedance of the gas sensor 200 is measured. Here, the impedance is measured in a condition in which the respective lengths of the first period TM11 and the second period TM12 are held fixed as in the example of FIG. 23, without being changed. Specifically, the processing is the same as the series of processing steps performed after step S13, described hereinafter, but with step S25 being omitted. The processing sequence shown in FIG. 8 is then ended.

If the processing load is a problem, then the processing of step S27 may be made the same as the series of steps performed after step S13, described hereinafter, but with steps S21, S22, and S25 being omitted.

If the start condition is satisfied at step S12, the processing proceeds to step S13. At step S13, the mask setting section 140 executes processing for starting a mask period TM10. Thus, the period which follows step S13 is set as a mask period TM10, which has been described referring to FIG. 3, etc.

At step S14 following step S13, processing for applying a sweep voltage to the gas sensor 200 in a first direction, that is, the first control, is started. As described above, this processing executes operations of opening and closing the switching element F1, and is performed by the control section 110. The first period TM11 shown in FIG. 3, etc., commences from the time at which the processing of step S14 is performed.

At step S15 following step S14, a decision is made as to whether the time point for acquiring the sweep current has been reached. The "time point for acquiring the sweep current" mentioned here corresponds, for example, to the time point t191 in (A) of FIG. 3, and may also be referred to as the "time point for acquiring the first measurement value". Here, a decision is made as to whether the current time is the above time point, with the decision based on whether a predetermined period has elapsed since the processing of step S14 was started.

If it is judged that the current time is not the time point for acquiring the sweep current, the processing of step S15 is repetitively executed. If it is judged that the current is the time point for acquiring the sweep current, then the processing proceeds to step S16.

At step S16, the value of the sweep current flowing through the gas sensor 200 is measured by the measurement section 120, and the absolute value of the value is acquired as a first measurement value.

At step S17 following step S16, the value of the sweep voltage applied to the gas sensor 200 (the potential difference between the points P15 and P13) is acquired by the measurement section 120.

At step S18 following step S17, the impedance of the gas sensor 200 is calculated based on the value of the sweep current measured at step S16 and the value of the sweep voltage measured at step S17. Specifically, the impedance is calculated by dividing the amount of increase in sweep voltage by the amount of increase in sweep current.

The impedance calculated at step S18 is used in control that is performed by the heater control section 130, i.e., control for adjusting the duty ratio of the voltage applied to the heater HT to maintain the temperature of the gas sensor 200 within the activation temperature range. This control is executed in parallel with the processing sequence shown in FIG. 8.

At step S19 following step S18, a decision is made as to whether the first period TM11 has elapsed since the time at which the processing of step S14 was performed. It should be noted that the length of the first period TM11 which is used for this judgement is the length of the first period TM11 that was set (was changed) at step S25, described hereinafter, when the processing sequence shown in FIG. 8 was performed in the previous control period.

If the first period TM11 has not yet elapsed, the processing of step S19 is repetitively executed, and the first control is continued. If the first period TM11 has elapsed, the processing proceeds to step S20. At step S20, processing for applying a sweep voltage to the gas sensor 200 in the second direction, i.e., second control, is started. As described above, this processing executes operations of opening and closing the switching element F2, and is performed by the control section 110. The second period TM12, shown in FIG. 3 etc., starts from the time at which the processing of step S20 is performed.

At step S21 following step S20, a decision is made as to whether the time point for acquiring the sweep current has been reached. The "time point for acquiring" mentioned here corresponds, for example, to the time point t291 in (A) of FIG. 3, and may also be referred to as "the time point for acquiring the second measurement value". Here, a decision is made as to whether the current time is the above time point, with the decision based on whether a predetermined period has elapsed since the processing of step S20 was started.

If it is judged that the current time is not the time point for acquiring the sweep current, the processing of step S21 is repetitively executed. If it is judged that the current time is the time point for acquiring the sweep current, the processing proceeds to step S22.

At step S22, the value of the sweep current flowing through the gas sensor 200 is measured by the measurement section 120, and the absolute value of that measured value is acquired as a second measurement value.

At step S23 following step S22, a decision is made as to whether the second period TM12 has elapsed from the time at which the processing of step S20 was performed. It should be noted that the length of the second period TM12 which is used for this judgement is the length of the second period TM12 that was set (was changed) at step S25, described hereinafter, when the processing sequence shown in FIG. 8 was performed in the previous control period.

If the second period TM12 has not yet elapsed, the processing of step S23 is repetitively executed, and the second control is continued. If the second period TM12 has elapsed, the processing proceeds to step S24. At step S24, the switching operation of the switching element F2 is halted and the switching element F2 is returned to the open state. The second control is thus ended.

At step S25 following step S24, processing is executed for changing the length of at least one of the first period TM11 and the second period TM12, based on the first measurement value acquired at step S16 and the second measurement value acquired at step S22. Further details concerning the contents of the processing performed at step S25 will be described referring to FIG. 10.

At step S41, a decision is made as to whether the first measurement value is greater than the second measurement value. If the first measurement value is judged to be no greater than the second measurement value, the processing proceeds to step S42. At step S42, as described referring to (B) in FIG. 3, processing is executed for lengthening the second period TM12. The second period TM12 whose length has thus been changed is used in the judgement of step S23, when the processing sequence shown in FIG. 8 is executed in the next control period.

If the first measurement value is judged to be no greater than the second measurement value at step S41, the processing proceeds to step S43. At step S43, a decision is made as to whether the first measurement value is less than the second measurement value. If the first measurement value is less than the second measurement value, the processing proceeds to step S44. At step S44, as described referring to (B) in FIG. 4, processing for lengthening the first period TM11 is performed. The first period TM11 whose length has thus been changed is used in the judgement at step S19, when the processing sequence shown in FIG. 8 is executed in the next control period.

Figure 10:
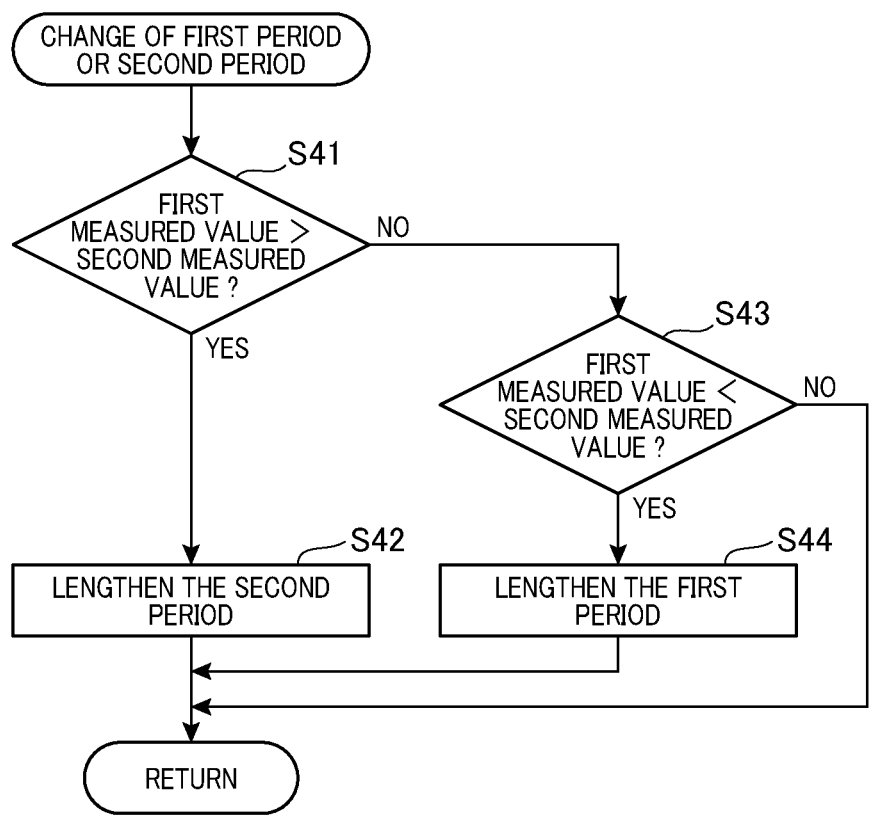
FIG. 10 is a flowchart of processing that is executed by the control apparatus of FIG. 1.

If the first measurement value is not less than the second measurement value at step S43, the processing sequence shown in FIG. 10 is ended. That signifies that the first measurement value and the second measurement value were equal to each other. Thus, the lengths of the first period TM11 and the second period TM12 are not changed.

The description will be continued, returning to FIG. 8. At step S26 following step S25, the mask setting section 140 executes processing for ending the mask period TM10. The time at which this processing is performed corresponds, for example, to time point t40 in (A) of FIG. 3.

The form of control shown in FIGS. 3 and 4 is realized through execution of the above-described processing by the control apparatus 100.

Figure 11:
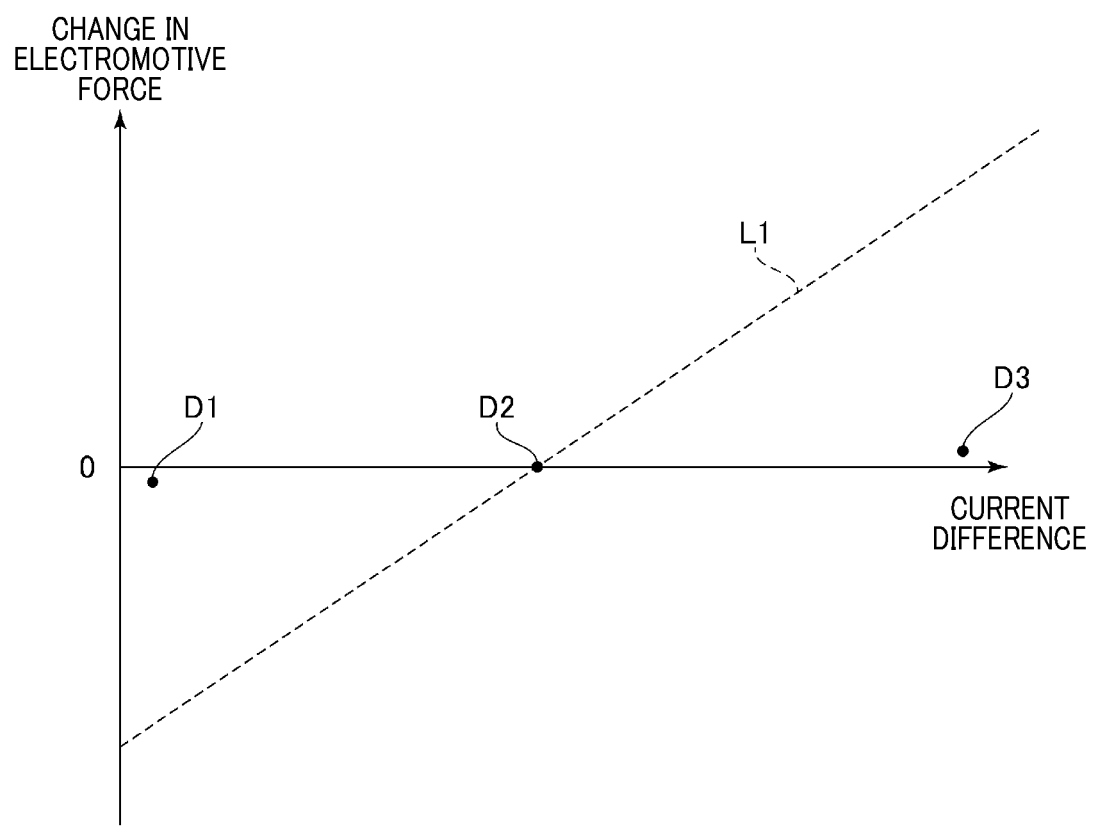
FIG. 11 is a diagram showing the relationship of the difference between the first measurement value and the second measurement value to an amount of change in the electromotive force of the gas sensor.

The effects of measuring the impedance by this embodiment as described above will be described referring to FIG. 11. The values along the horizontal axis in the graph of FIG. 11 are obtained by subtracting the second measurement values from the first measurement values, and in the case of this embodiment these can be said to be "current differences". The values along the vertical axis in the graph are obtained by subtracting the electromotive force of the gas sensor 200 from the potential difference between the points P15 and P13 after the measurement of the impedance has been repetitively performed a predetermined number of times. Thus, the values indicate how much the electromotive force of the gas sensor 200 that is measured by the measurement section 120 changes from the (correct) value that corresponds to the gas concentration, due to the influence of the accumulated charge. Hereinafter, the values plotted along the vertical axis are also referred to as "electromotive force fluctuation amounts".

The line L1 in FIG. 11 expresses the variation of the electromotive force fluctuation amount with time, in the case in which the lengths of the first period TM11 and the second period TM12 are not changed but are held fixed. In that case, as the difference between the first measurement value and the second measurement value increases, the charge accumulated in the gas sensor 200 also increases, and thus, the amount of fluctuation in the electromotive force also increases.

In FIG. 11, the points D1, D2 and D3 indicate measured values of the amount of electromotive force variation when the lengths of the first period TM11 and the second period TM12 are changed as described above. As indicated by these points D1, etc., with the control performed by the control apparatus 100 of the present embodiment, the fluctuation of the electromotive force is held within a very narrow range (within ±5 mV), irrespective of the difference between the first measurement value and the second measurement value. As a result, it is possible to accurately measure the gas concentration in the concentration measurement period TM20.

The second embodiment will be described referring to FIG. 12. This embodiment differs from the first embodiment only with respect to the contents of the processing performed at step S11 of FIG. 8, specifically the contents of the start condition. In the following, points of difference from the first embodiment will mainly be described.

Figure 9:
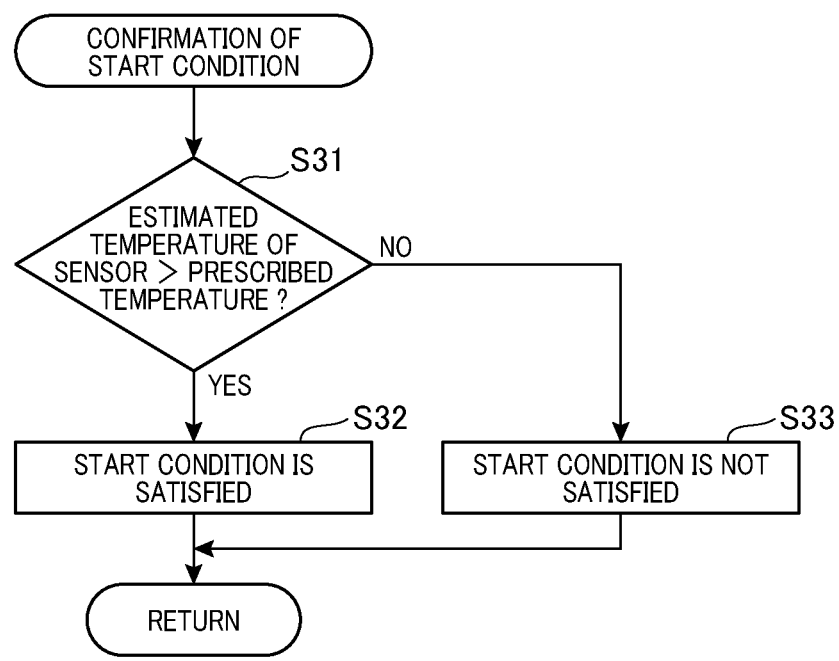
FIG. 9 is a flowchart of processing that is executed by the control apparatus of FIG. 1.
Figure 12:
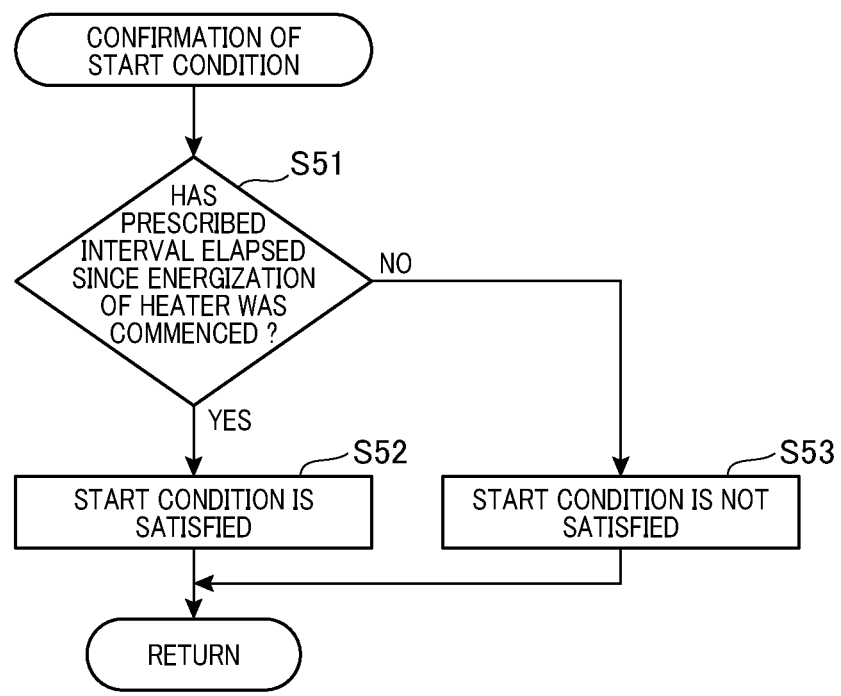
FIG. 12 is a flowchart of processing that is executed by a control apparatus according to a second embodiment.

The processing sequence shown in FIG. 12 is a specific flow of processing that is performed at step S11 of FIG. 8, and is executed in place of the processing sequence shown in FIG. 9.

In the first step S51, a decision is made as to whether a predetermined period has elapsed since the heater control section 130 commenced energization of the heater HT. This "predetermined period" is set as the period required for the temperature of the gas sensor 200 to reach a sufficient temperature (i.e., the minimum temperature at which the gas sensor 200 can operate) after heating by the heater HT has started.

If it is judged at step S51 that the predetermined period has elapsed since the start of energization of the heater HT, the processing proceeds to step S52. At step S52, it is judged that the start condition is satisfied.

On the other hand, if it is judged at step S51 that the predetermined period has not elapsed since the start of energization of the heater HT, processing proceeds to step S53. At step S53, it is judged that the start condition is not satisfied.

As described above, with the present embodiment, the start condition is set as being the fact that a predetermined period has elapsed since the start of energization of the heater HT. Thus, the control section 110 commences the processing for changing the length of at least one of the first period and the second period only after a predetermined period has elapsed since the start of energization of the heater. It is possible to thereby avoid a situation in which adjustment of the first period TM11, etc., is performed unnecessarily even when the gas concentration in the gas sensor 200 cannot yet be measured. With this form also, the same effects as those described for the first embodiment can be obtained.

Figure 13:
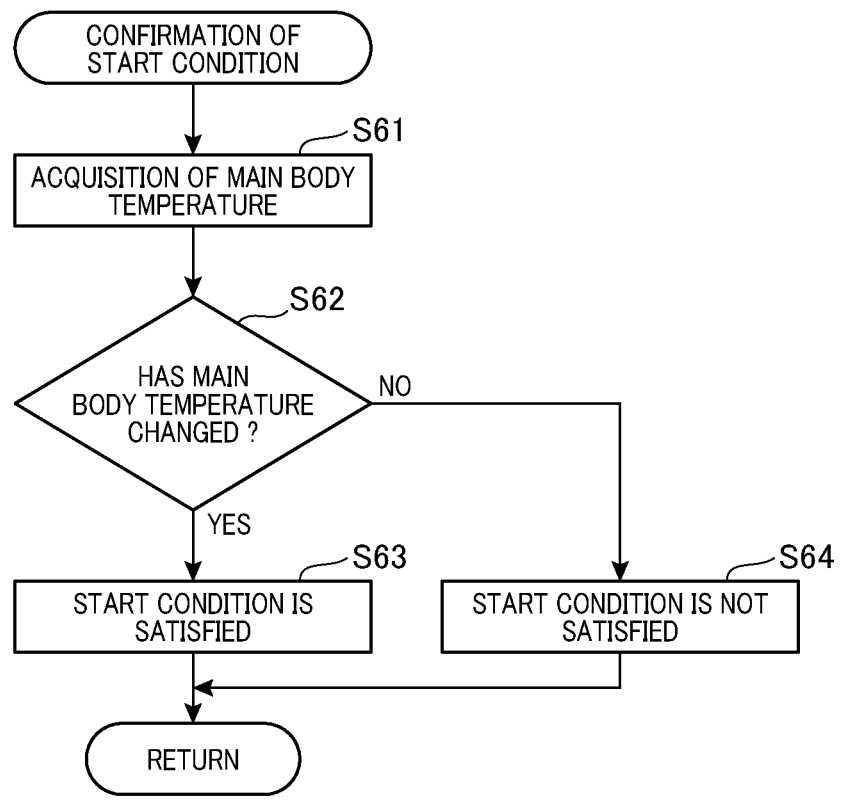
FIG. 13 is a flowchart of processing that is executed by a control apparatus according to a third embodiment.

The third embodiment will be described referring to FIG. 13. This embodiment differs from the first embodiment only with respect to the contents of the processing performed at step S11 of FIG. 8, specifically the contents of the start condition. In the following, points of difference from the first embodiment will mainly be described.

The processing sequence shown in FIG. 12 is a specific flow of processing that is performed at step S11 of FIG. 8, and is executed in place of the processing sequence shown in FIG. 9.

In the first step S61, the temperature (main body temperature) of the control apparatus 100 is acquired by the temperature sensor 150. At step S62 following step S61, a decision is made as to whether the temperature of the control apparatus 100 that was acquired at step S62 has changed from the temperature of the control apparatus 100 that was acquired in the preceding control period. For example, if the absolute value of the difference between the precedingly acquired temperature and the currently acquired temperature exceeds a prescribed threshold, it is judged that the temperature of the control apparatus 100 has changed.

If it is judged at step S62 that the temperature of the control apparatus 100 has changed, the processing proceeds to step S63. At step S63, it is judged that the start condition is satisfied.

On the other hand, if it is judged at step S62 that the temperature of the control apparatus 100 has not changed, the processing proceeds to step S64. At step S64, it is judged that the start condition is not satisfied.

As described above, with this embodiment, a change in the temperature of the control apparatus 100 is set as the start condition. Thus, when the temperature measured by the temperature sensor 150 changes, the control section 110 commences processing for changing the length of at least one of the first period TM11 and the second period TM12. Thus, it is made possible to prevent a situation in which adjustment of the first period TM11, etc., is performed unnecessarily, even though the resistance values of the resistor R14, etc., have not changed with temperature, and the necessity of adjusting the first period TM11, etc., is low. With this form also, the same effects as those described for the first embodiment can be obtained.

The fourth embodiment will be described referring to FIG. 14. This embodiment differs from the first embodiment only with respect to the contents of the processing performed at step S11 of FIG. 8, specifically the content s of the start condition. In the following, points of difference from the first embodiment will mainly be described.

Figure 14:
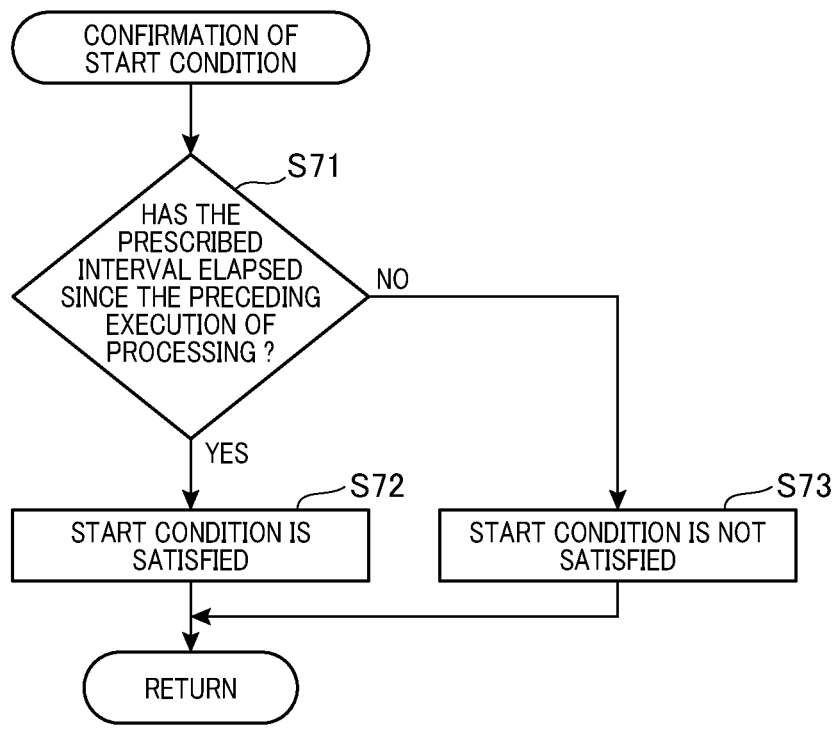
FIG. 14 is a flowchart of processing that is executed by a control apparatus according to a fourth embodiment.

The processing sequence shown in FIG. 14 is a specific flow of processing that is performed at step S11 of FIG. 8, and is executed in place of the processing sequence shown in FIG. 9.

In the first step S71, a decision is made as to whether a predetermined period has elapsed since the preceding execution of the processing of step S13 and subsequent steps shown in FIG. 8. If the predetermined period has elapsed, the processing proceeds to step S72. At step S72, it is judged that the start condition is satisfied. On the other hand if it is judged at step S71 that the predetermined period has not elapsed, the processing proceeds to step S73. At step S73, it is judged that the start condition is not satisfied.

As described above, with the present embodiment, the start condition is set as being that a predetermined period has elapsed since the processing of step S13 and subsequent steps was performed. Thus, the control section 110 commences processing for changing the length of at least one of the first period TM11 and the second period TM12 each time the predetermined period elapses.

Since measurement of the impedance is performed regularly and appropriately, without complex processing, the processing load on the control apparatus 100 can be reduced. With such a form also, the same effects as those described for the first embodiment can be obtained.

A fifth embodiment will be described referring to FIG. 15. This embodiment differs from the first embodiment only with respect to the contents of the processing performed at step S25 of FIG. 8. In the following, points of difference from the first embodiment will mainly be described.

Figure 15:
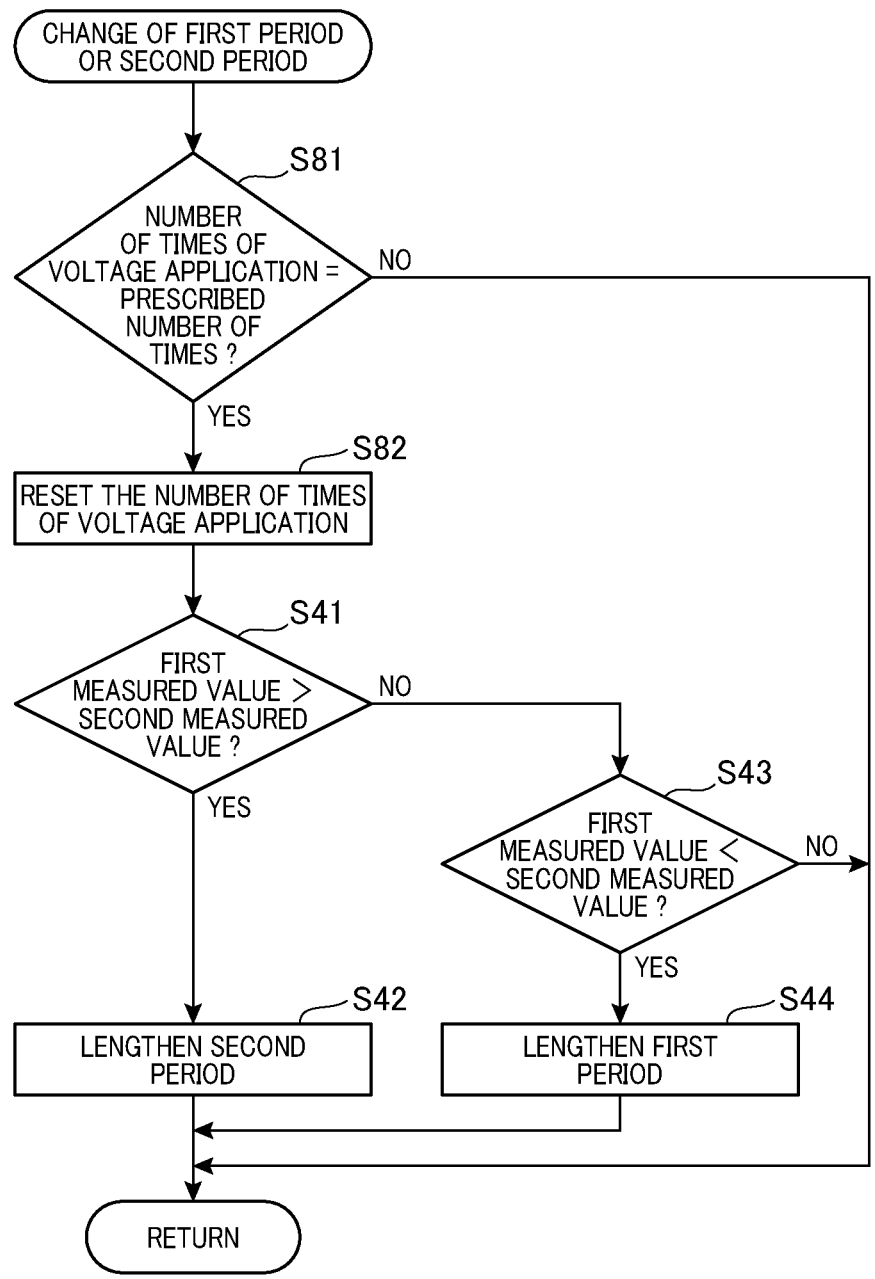
FIG. 15 is a flowchart of processing that is executed by a control apparatus according to a fifth embodiment.

The processing sequence shown in FIG. 15 is a specific flow of processing that is performed at step S25 of FIG. 8, and is executed in place of the processing sequence shown in FIG. 10. This processing is implemented by adding steps S81 and S82 at the start of the processing sequence shown in FIG. 10.

The control apparatus 100 counts the number of times the sweep voltage is applied to the gas sensor 200 (which can be said to be the number of times that the impedance is measured), and stores the number. That number of times is also referred to in the following as "the number of times of application". In the first step S81 a decision is made as to whether the number of times of application has reached a predetermined number. If the number of times of application has reached the predetermined number, the processing proceeds to step S82.

At step S82, the number of times of application is reset to zero. At step S41 and the other steps that follow step S82, processing similar to that described referring to FIG. 10 is performed. Thus, specific description is omitted.

At step S81, if the number of times of application has not reached the predetermined number, the processing sequence shown in FIG. 15 is ended without changing the length of the first period TM11 or the second period TM12.

With the control section 110 of this embodiment, as a result of executing the processing described above ,processing for changing the length of at least one of the first period TM11 and the second period TM12 is executed each time the number of times of application of the sweep voltage to the gas sensor 200 reaches a predetermined number. For example, when processing for changing the length of the first period TM11 has been executed, then thereafter the length of the first period TM11 is maintained unchanged and the application of the sweep voltage and measurement of the impedance are repetitively performed, until the number of times of application reaches the predetermined number. The processing load on the control apparatus 100 can thereby be reduced, by comparison with the case in which the length of the first period TM11, etc., is changed in each control period. With such a form also, the same effects can be obtained as those described for the first embodiment.

A sixth embodiment will be described referring to FIG. 16. This embodiment differs from the first embodiment only with respect to the contents of the processing performed at step S25 of FIG. 8. In the following, points of difference from the first embodiment will mainly be described.

Figure 16:
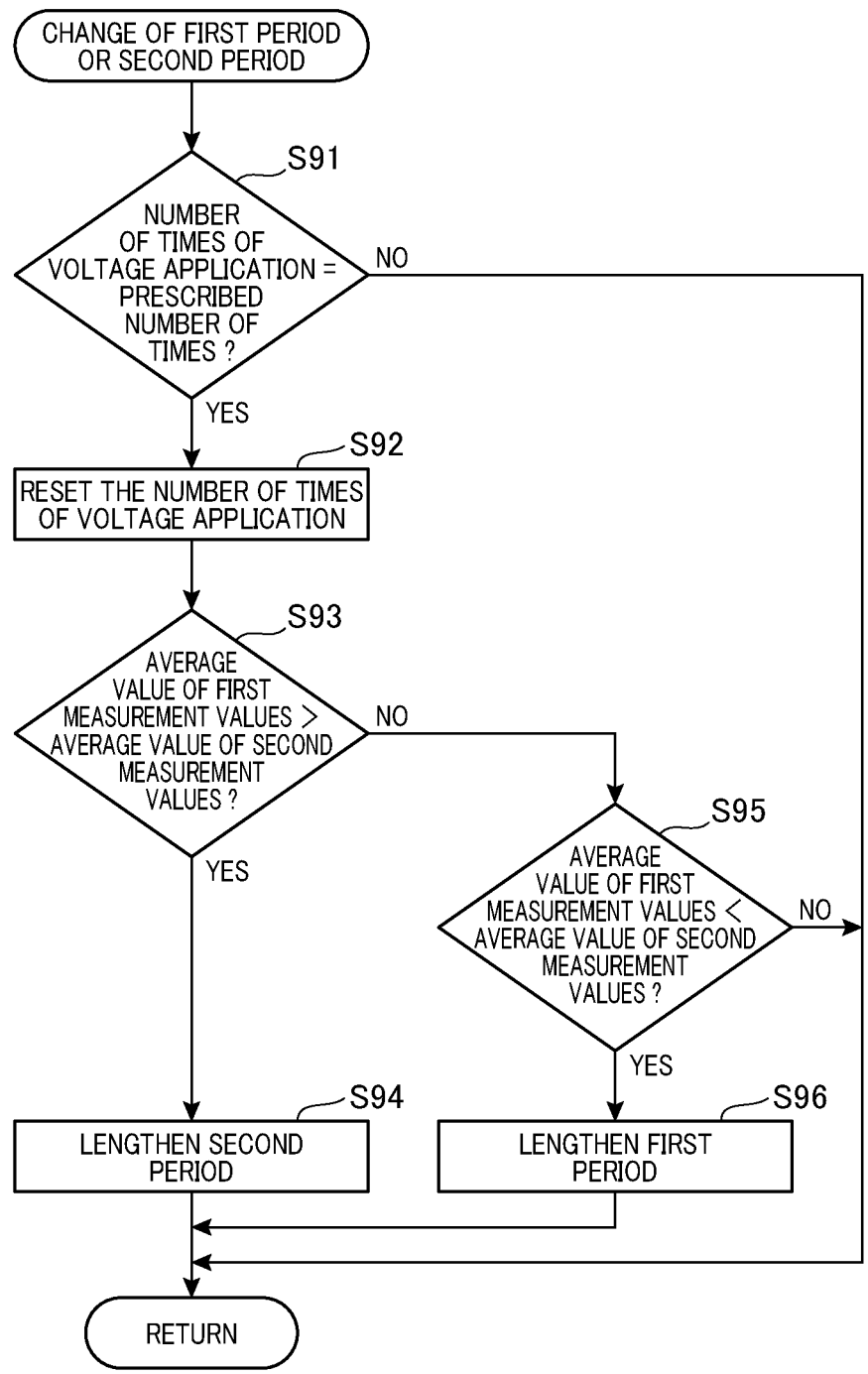
FIG. 16 is a flowchart of processing that is executed by a control apparatus according to a sixth embodiment.

The processing sequence shown in FIG. 16 is a specific flow of processing that is performed at step S25 of FIG. 8, and is executed in place of the processing sequence shown in FIG. 10.

Furthermore with the present embodiment, as with the fifth embodiment described above, the control apparatus 100 counts the number of times of application. The control apparatus 100 stores the first measurement value and the second measurement value acquired by the measurement section 120 as history, each time the processing sequence shown in FIG. 8 is performed.

In the first step S91 a decision is made as to whether the number of times of applications has reached a predetermined number. The predetermined number of times is set in advance as the number of first measurement values, etc., necessary for calculating the respective averages of the first measurement value and the second measurement value. If the number of times of application has reached the predetermined number, the processing proceeds to step S92. At step S92, the number of times of application is reset to zero.

At step S93 following step S92, the average value is calculated of a number of acquired first measurement values that is equal to the predetermined number. In addition, the average value is calculated of a number of acquired second measurement values that is equal to the predetermined number. A decision is then made as to whether the average value of the first measurement values is greater than the average value of the second measurement values.

If the average value of the first measurement values is greater than that of the second measurement values, the processing proceeds to step S94. At step S94, processing for lengthening the second period TM12 is performed, as described referring to (B) in FIG. 3.

If it is judged at step S93 that the average value of the first measurement values is no greater than the average value of the second measurement values, the processing proceeds to step S95. At step S95, a decision is made as to whether the average value of the first measurement values is less than that of the second measurement values. If the average value of the first measurement values is less than that of the second measurement values, the processing proceeds to step S96. At step S96, processing for lengthening the first period TM11 is performed, as described referring to (B) in FIG. 4.

If the average value of the first measurement values is not less than the average value of the second measurement values at step S95, the processing sequence shown in FIG. 16 is ended. This signifies that the average values of the first measurement value and the second measurement value were equal to each other. Thus, the lengths of the first period TM11 and the second period TM12 are not changed.

At step S91, if the number of times of application has not reached the predetermined number, the processing sequence shown in FIG. 16 is ended, without changing the length of the first period TM11 or the second period TM12.

With the present embodiment as described above, after the application of the sweep voltage to the gas sensor 200 and the measurement of the sweep current by the measurement section 120 (which could equally be measurement of the sweep voltage) have each been performed a plurality of times, the control section 110 changes the length of least one of the first period TM11 and the second period TM12, with the change taking effect in the next and subsequent processing periods, and with the change being executed based on a comparison between the respective averages of the first measurement values and the second measurement values.

Specifically, if the average value of the first measurement values is greater than that of the second measurement values, the control section 110 changes the second period TM12 to become longer, with the change taking effect in the next and subsequent processing periods, while if the average value of the first measurement values is less than that of the second measurement values, the control section 110 changes the first period TM11 to become longer, with the change taking effect in the next and subsequent processing periods.

Thus, even if the first measurement value or the second measurement value changes temporarily, due to the influence of noise etc., the effect on the length of the first period TM11 or the second period TM12 can be reduced. Measurement of gas concentration can thereby be performed with greater stability.

A seventh embodiment will next be described. The control apparatus 100 of this embodiment too changes the length of at least one of the first period TM11 and the second period TM12, for suppressing the effects of accumulated charge on the electromotive force. However, the form of the change differs from that of the first embodiment. A specific example will be described referring to FIG. 17.

Figure 17:
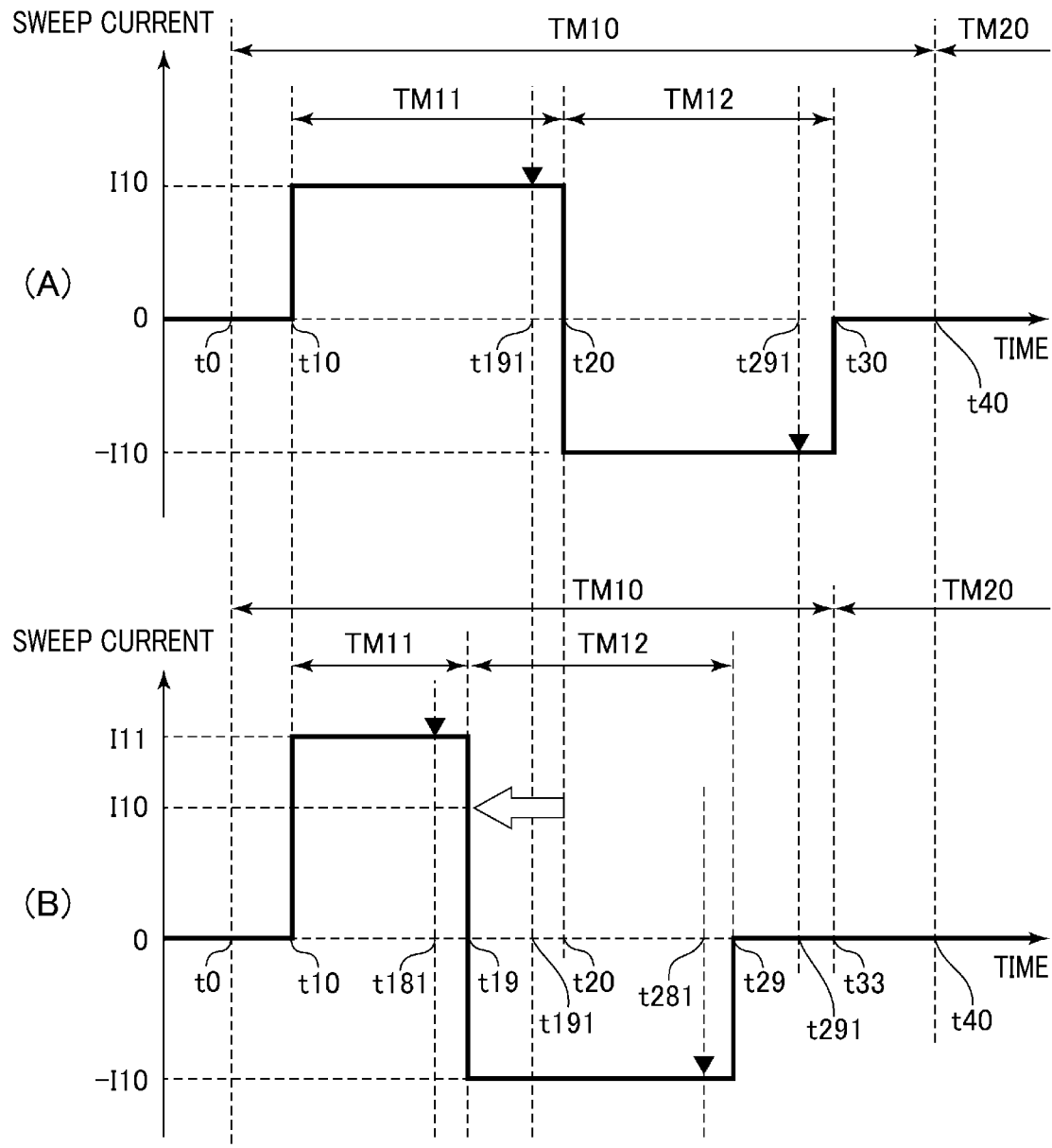
FIG. 17 is a diagram showing the variation with time of a sweep current that flows in the gas sensor, when impedance measurement is executed by a control apparatus according to a seventh embodiment.

In the same way as for the case of FIG. 2 described hereinabove, (A) in FIG. 17 shows the variation with time of the sweep current in the case in which the value of the sweep current in the first period TM11 and the value of the sweep current in the second period TM12 coincide with the respective target values (I10 and −I10).

(B) in FIG. 17 shows the variation with time of the sweep current when the value of the sweep current in the first period TM11 becomes I11, which is greater than the target value I10. In the example of (B) in FIG. 17, the first measurement value (I11) is greater than the second measurement value (I10).

If the first measurement value exceeds the second measurement value, the control section 110 of this embodiment changes the length of the first period TM11 such as to become shorter than in the case of (A) in FIG. 17. In the example of (B) in FIG. 17, the time at which the first period TM11 ends (which is also the start time of the second period TM12) is changed to time point t19, which precedes time point t20.

Furthermore together with this, the time at which the second period TM12 ends is changed from time point t30 to time point t29. Thus, the length of the second period TM12 in (B) of FIG. 17 is the same as the length of the second period TM12 in (A) of FIG. 17.

As a result of the above change, the length of the first period TM11 in (B) of FIG. 17 is less than that of the first period TM11 in (A) of FIG. 17.

It should be noted that in (B) of FIG. 17, the mask period TM10 is also made shorter, together with the shortening of the first period TM11. Specifically, the time at which the mask period TM10 ends is changed from time point t40 to time point t33. As a result of the mask setting section 140 executing such processing, the transition to the concentration measurement period TM 20 and the measurement of the gas concentration can be performed at an early stage.

In (B) of FIG. 17, the amount of charge accumulated per unit time in the gas sensor 200 in the first period TM11 is greater than in the case of (A) in FIG. 17. However, in (B) of FIG. 17, since the first period TM11 has become short, the amount (total amount) of charge accumulated in the gas sensor 200 in the first period TM11 is almost the same as in the case of (A) in FIG. 17.

As a result, the difference between the amount of charge accumulated in the gas sensor 200 in the first period TM11 and the amount of charge released from the gas sensor 200 in the second period TM12 can be held as small as in the case of (A) in FIG. 17. Since accumulation of charge on the gas sensor 200 in the mask period TM10 is suppressed, the gas concentration can be accurately measured by the gas sensor 200.

In addition, even if the second measured value becomes less than I10 and as a result, the first measured value becomes greater than the second measured value, the first period TM11 is also changed, to become shorter. In this case too, accumulation of charge on the gas sensor 200 is suppressed as described above.

As described above, if the first measurement value is greater than the second measurement value, the control section 110 of the present embodiment changes the first period TM11 such as to become shorter. If on this occasion it were attempted to acquire the first measurement value at the same timing (t191) as in (A) of FIG. 17, i.e., during the first period TM11 in (A) in FIG. 17, the first period TM11 would have already ended by that time, so that it would not be possible to obtain the first measurement value accurately.

Thus, if the first period TM11 is changed to become shorter, as with the present embodiment, the timing at which the measurement section 120 executes measurement (acquisition of the first measurement value) is also changed. In the example of (B) in FIG. 17, this timing is changed such that the first measurement value is acquired at time point t181, which precedes time point t191. The period from time point t10 to time point t181 is shorter than the first period TM11, after the change in the first period TM11. By changing the timing at which the first measurement value is acquired as described above, the first measurement value can be accurately acquired in the first period TM11.

In the example of (B) in FIG. 17, the timing at which the second measurement value is acquired after the second period TM12 is reached is not changed. In (B) of FIG. 17, the second measurement value is acquired at time point t281, which precedes time point t291, but the length of the period from time point t19 to time point t281 is the same as the length of the period from time point t20 to time point t291 in (A) of FIG. 17.

Figure 18:
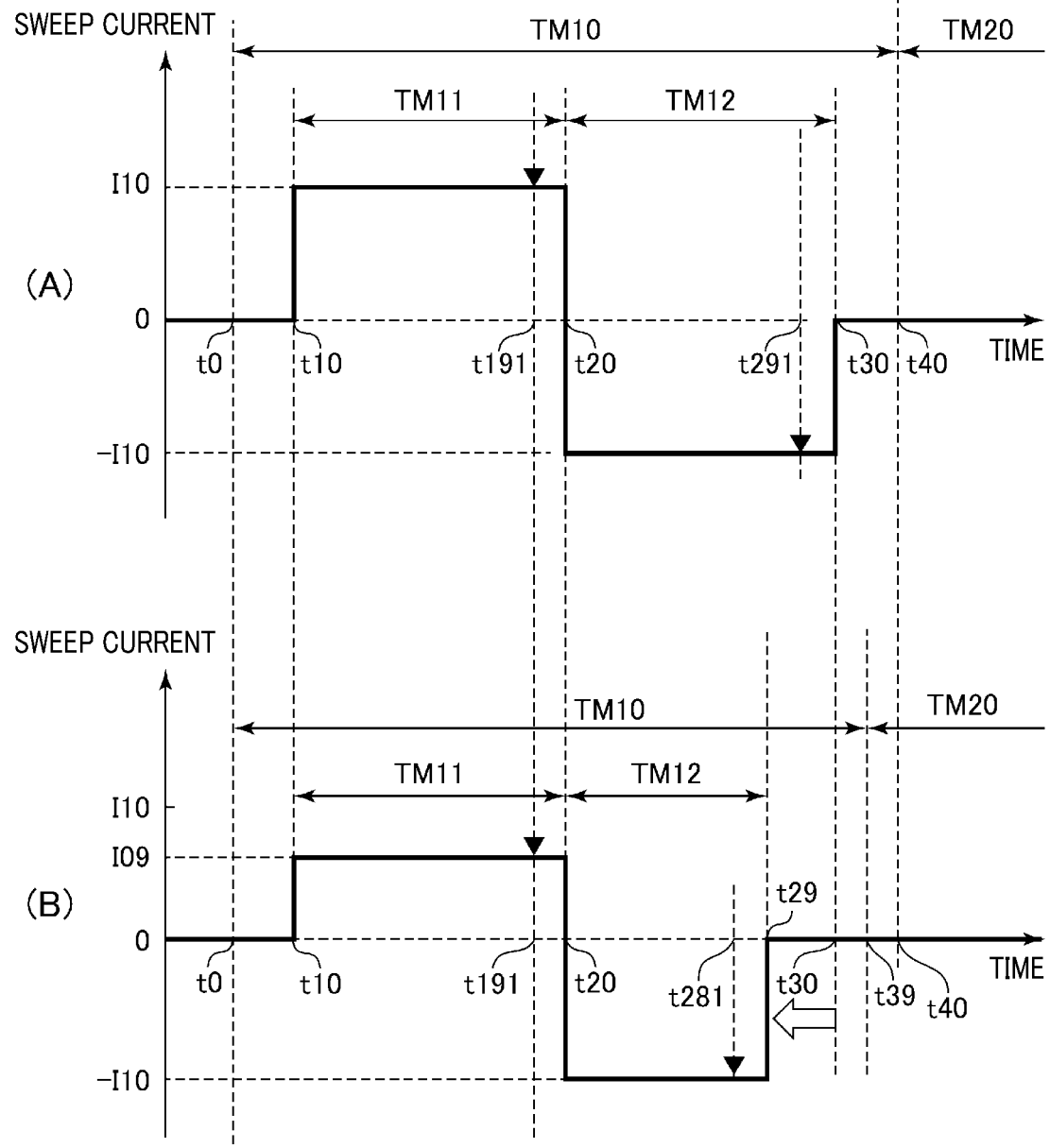
FIG. 18 is a diagram showing the variation with time of a sweep current that flows in the gas sensor, when impedance measurement is executed by a control apparatus according to the seventh embodiment.

As opposed to the above, an example in which the first measurement value becomes less than the second measurement value will be described referring to FIG. 18. In FIG. 18, (A) shows a case in which, as with the case of FIG. 2 described above, the variation with time of the sweep current is such that the value of the sweep current in the first period TM11 and the value of the sweep current in the second period TM12 coincide with the respective target values (I10 and −I10).

(B) in FIG. 18 shows the case in which variation with time of the sweep current is such that the value of the sweep current in the first period TM11 becomes I09, which is less than the target value I10. In the example of (B) in FIG. 18, the first measurement value (I09) is less than the second measurement value (I10).

If the first measurement value is less than the second measurement value, the control section 110 of the control apparatus 100 changes the length of the second period TM12 to become shorter than in the case of (A) in FIG. 18. In the example of (B) in FIG. 18, the time at which the second period TM12 ends is changed to time point t29, which precedes time point t30.

As a result of the above change, in (B) of FIG. 18, the second period TM12 is made shorter than the first period TM11.

In (B) of FIG. 18, since the second period TM12 is shortened, the mask period TM10 is also shortened. Specifically, the time at which the mask period TM10 ends is changed from time point t40 to time point t39. As a result of the mask setting section 140 executing such processing, the transition to the concentration measurement period TM 20 and the measurement of the gas concentration can be performed early.

In (B) of FIG. 17, since the second period TM12 is shortened, the amount of charge released from the gas sensor 200 in the second period TM12 is reduced. Thus, not only does the charge accumulated in the gas sensor 200 in the first period TM11 decrease, but also the charge released from the gas sensor 200 in the second period TM12 decreases.

As a result, the difference between the amount of charge accumulated in the gas sensor 200 in the first period TM11 and the amount of charge released from the gas sensor 200 in the second period TM12 can be kept as small as in the case of (A) in FIG. 18. Since accumulation of charge on the gas sensor 200 in the mask period TM10 is suppressed, the gas concentration can be accurately measured by the gas sensor 200.

It should be noted that the second period TM12 is also changed to become shorter in the case in which the second measured value becomes greater than I10 and as a result, the first measured value becomes less than the second measured value. In this case too, accumulation of charge on the gas sensor 200 is suppressed as described above.

As described above, if the first measurement value is less than the second measurement value, the control section 110 of the present embodiment changes the second period TM12 to become shorter. In that case, if it were attempted to acquire the second measurement value at the same timing (t291) as in (A) of FIG. 18, i.e., after the second period TM12 has commenced, the second period TM12 would have already ended by that time, so that it would not be possible to obtain the second measurement value accurately.

Thus, if the second period TM12 is changed to become shorter, as with the present embodiment, the timing at which the measurement section 120 performs measurement (acquisition of the second measurement value) is also changed. In the example of (B) in FIG. 18, that timing is changed such that the first measurement value is acquired at time point t281, prior to time point t291. The period from time point t20 to time point t281 is shorter than the second period TM12 after the change. By changing the timing at which the second measurement value is acquired as described above, the second measurement value can be accurately acquired in the second period TM12.

In the example of (B) in FIG. 18, no change is made in the timing (t191) at which the first measurement value is acquired after the first period TM11 is reached.

With this embodiment as described above, if the first period T11 or the second period T12 becomes short, the timing for acquiring the first measurement value or for acquiring the second measurement value is changed appropriately. If the processing load that is caused by such a change is a problem, it is preferable to extend the first period T11 or the second period T12, as with the first embodiment (FIGS. 3 and 4).

It should be noted that the change in the first period TM11 or the second period TM12 described above is not executed in the current mask period but in the next mask period TM10, as described above for the first embodiment referring to FIG. 5.

In a similar way to the method described for the first embodiment referring to FIG. 6, the control section 110 of the present embodiment changes the length of the first period TM11 or the second period TM12 such that the respective absolute values of the time integral of the value measured by the measurement section 120 in the first period TM11 (the area S1 in FIG. 6) and the time integral of the value measured by the measurement section 120 in the second period TM12 (the area S2 in FIG. 6) coincide with each other.

Specific contents of processing executed by the control apparatus 100 for the control described above will be described next. With this embodiment also, processing is executed which is similar to that of the first embodiment as described above referring to FIGS. 7 to 9. However, in the processing executed with the present embodiment, the processing sequence shown in FIG. 10 for the first embodiment (that is, the processing executed at step S25 of FIG. 8) is replaced by the processing sequence shown in FIG. 19.

Figure 19:
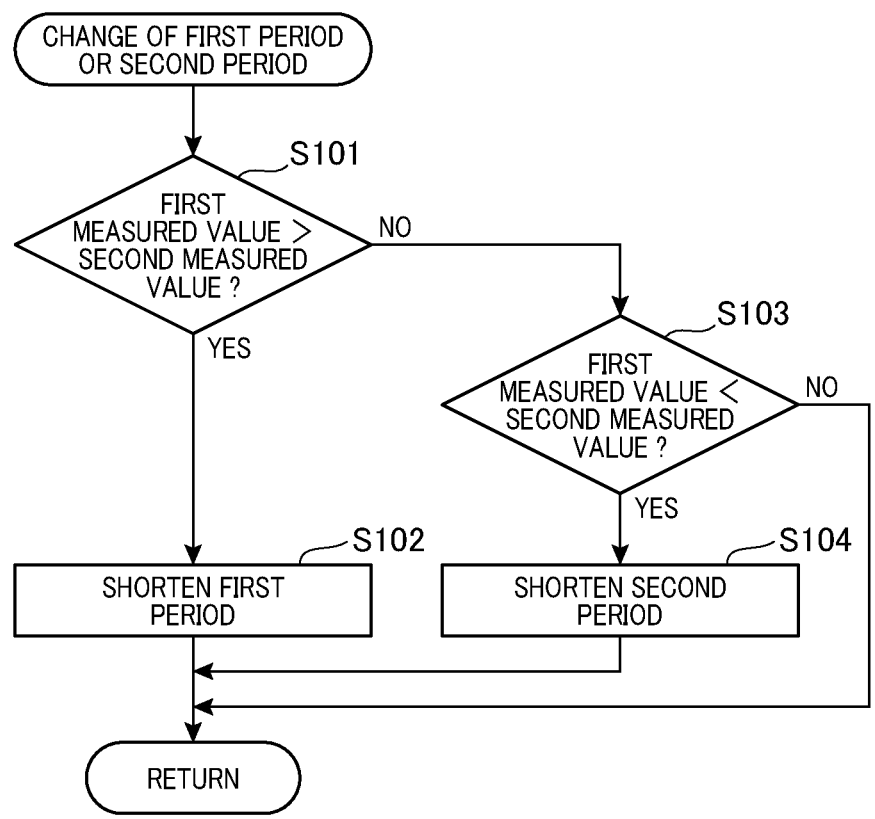
FIG. 19 is a flowchart of processing that is executed by a control apparatus according to the seventh embodiment.

In the first step S101 of the processing shown in FIG. 19, a decision is made as to whether the first measurement value is greater than the second measurement value. If the first measurement value is greater than the second measurement value, the processing proceeds to step S102. At step S102, as described referring to (B) in FIG. 17, processing for shortening the first period TM11 is performed. The first period TM11 whose length has thus been changed is used in the judgement of step S19, when the processing sequence shown in FIG. 8 is executed in the next control period.

At step S101, if the first measurement value is not greater than the second measurement value, the processing proceeds to step S103. At step S103 a decision is made as to whether the first measurement value is less than the second measurement value. If the first measurement value is less than the second measurement value, the processing proceeds to step S104. At step S104, processing is executed for shortening the second period TM12, as described referring to (B) in FIG. 18. The second period TM12 whose length has thus been changed is used in the judgement of step S23, when the processing sequence shown in FIG. 8 is executed in the next control period.

If it is judged at step S103 that the first measurement value is not less than the second measurement value, the processing sequence shown in FIG. 19 is ended. This signifies that the first measurement value and the second measurement value were equal to each other. Thus, the lengths of the first period TM11 and the second period TM12 are not changed.

As a result of execution of the above processing by the control apparatus 100, control of the form shown in FIGS. 17 and 18 is realized.

An eighth embodiment will be described referring to FIG. 20. This embodiment differs from the above-described seventh embodiment only with respect to contents of the processing performed at step S25 of FIG. 8. In the following, points of difference from the seventh embodiment will mainly be described.

Figure 20:
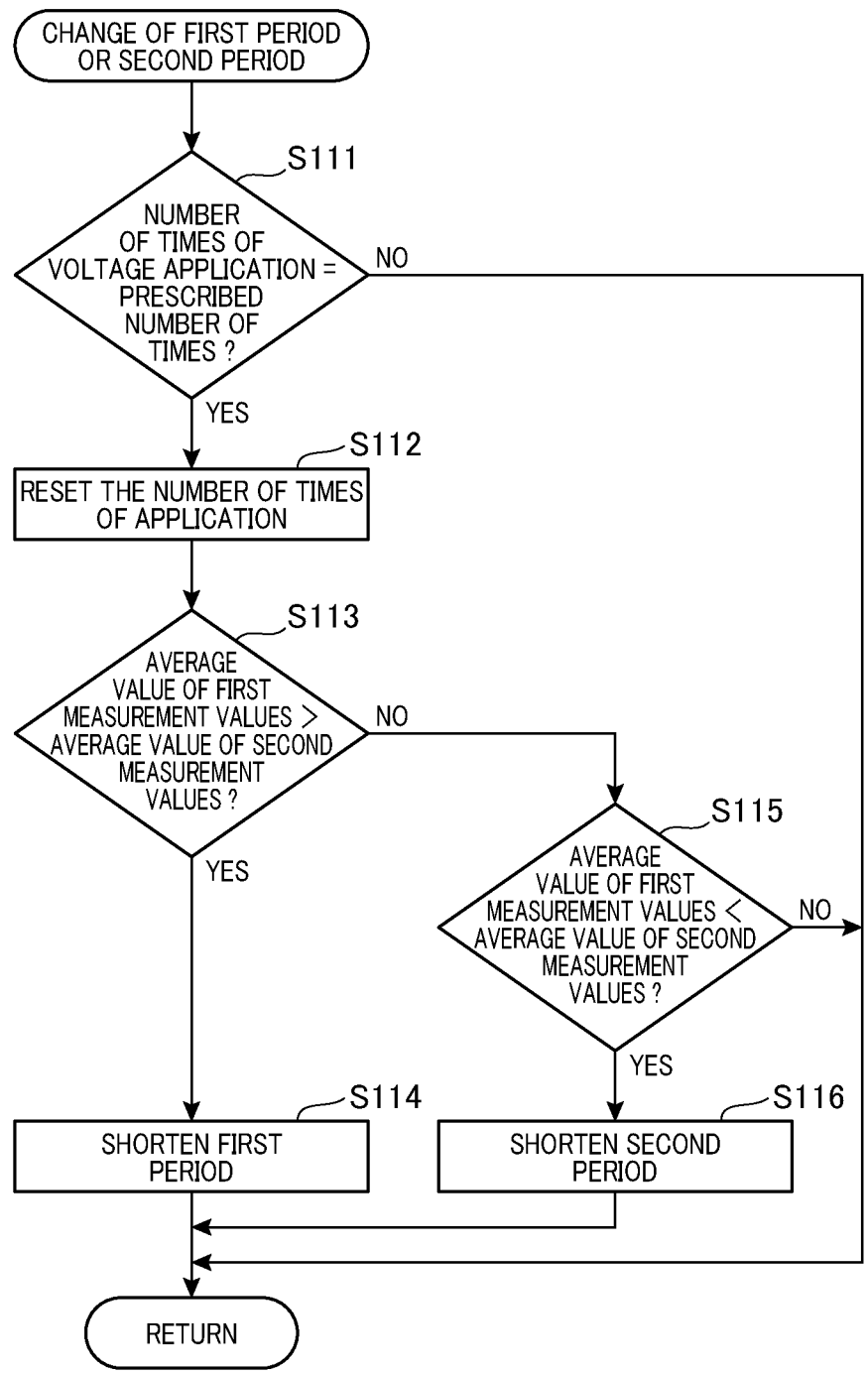
FIG. 20 is a flowchart of processing that is executed by a control apparatus according to an eighth embodiment.

The processing sequence in FIG. 20 shows a specific flow of the processing performed at step S25 of FIG. 8, and is executed in place of the processing sequence shown in FIG. 19.

With the present embodiment also, as with the fifth embodiment (FIG. 15), the control apparatus 100 counts the number of times of application. Furthermore the control apparatus 100 stores the first measurement value and the second measurement value acquired by the measurement section 120 as history, each time the processing sequence shown in FIG. 8 is executed.

In the first step S111, a decision is made as to whether the number of times of voltage application has reached a predetermined number. The predetermined number of times is set in advance as the number of first measurement values, etc., necessary for calculating the respective average values of the first measurement values and the second measurement values. If the number of times of application has not reached the predetermined number, the processing sequence shown in FIG. 20 is ended without changing the length of the first period TM11 or the second period TM12. If the number of times of application has reached the predetermined number, the processing proceeds to step S112.

At step S112, the number of times of application is reset to zero. At step S113 following step S112, the average value of a number of acquired first measurement values that is equal to the above-described predetermined number is calculated. In addition, the average value of a number of acquired second measurement values that is equal to the above-described predetermined number is calculated. A decision is then made as to whether the average value of the first measurement values is greater than that of the second measurement values.

If the average value of the first measurement values is greater than the average value of the second measurement values, the processing proceeds to step S114. At step S114, processing is executed for shortening the first period TM11, as described referring to (B) in FIG. 17.

If it is judged that the average value of the first measurement values is not greater than the average value of the second measurement values at step S113, the processing proceeds to step S115. At step S115 a decision is made as to whether the average value of the first measurement values is less than that the second measurement values. If the average value of the first measurement values is less than that of the second measurement values, the processing proceeds to step S116. At step S116, processing for shortening the second period TM12 is executed, as described referring to (B) in FIG. 18.

If it is judged that the average value of the first measurement values is not less than that of the second measurement values at step S115, the processing sequence shown in FIG. 20 is ended. This signifies that the average value of the first measurement value and the average value of the second measurement value were equal to each other. Thus, the lengths of the first period TM11 and the second period TM12 are not changed.

With this embodiment, as described above, after the application of the sweep voltage to the gas sensor 200 and the measurement of the sweep current by the measurement section 120 (which could equally be measurement of the sweep voltage) have each been performed a plurality of times, the control section 110 changes the length of least one of the first period TM11 and the second period TM12, with the change taking effect in the next and subsequent processing periods, and with the change being executed based on a comparison between the respective averages of the first measurement values and the second measurement values.

Specifically, if the average value of the first measurement values is greater than that of the second measurement values, the control section 110 changes the first period TM11 to become shorter, with the change taking effect in the next and subsequent processing periods, while if the average value of the first measurement values is less than that of the second measurement values, the control section 110 changes the second period TM12 to become shorter, with the change taking effect in the next and subsequent processing periods.

Thus, even if the first measurement value or the second measurement value changes temporarily, due to the effects of noise, etc., the influence on the length of the first period TM11 or the second period TM12 can be reduced. Measurement of gas concentration can thereby be performed with greater stability.

A ninth embodiment will be described referring to FIG. 21. This embodiment differs from the first embodiment only with respect to contents of the processing performed at step S25 of FIG. 8. In the following, points of difference from the first embodiment will mainly be described.

Figure 21:
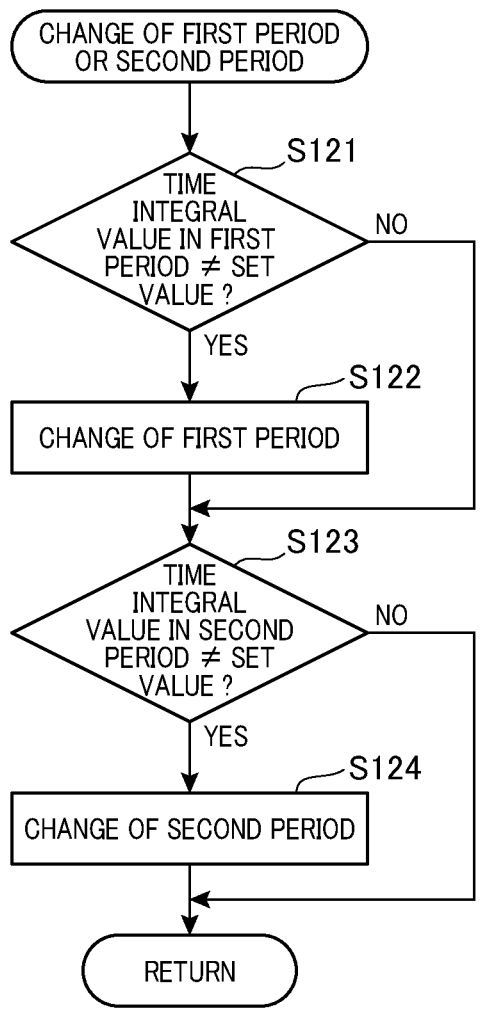
FIG. 21 is a flowchart of processing that is executed by a control apparatus according to a ninth embodiment.

The processing sequence in FIG. 21 shows a specific flow of the processing performed at step S25 of FIG. 8, and is executed in place of the processing sequence shown in FIG. 10.

In the first step, S121, a decision is made as to whether the time integral value of the value (sweep current or sweep voltage) measured by the measurement section 120 in the first period TM11 matches a prescribed design value. The absolute value of the "time integral value of the value measured by the measurement section 120 in the first period TM11" corresponds to the area 51 shown in FIG. 6. Such a time integral value can be calculated by multiplying the first measurement value acquired at time point t191 in FIG. 3 by the length of the first period TM11. Alternatively, the first measurement value may be acquired a plurality of times in the first period TM11, to calculate the time integral value more accurately.

Furthermore the "prescribed design value" referred to here signifies the above-described time integral value for the case in which the first measurement value matches the target value and the length of the first period TM11 corresponds to the original design value.

If the time integral value matches the design value, the processing proceeds to step S123, described hereinafter, without changing the length of the first period TM11. If the time integral value does not match the design value, the processing proceeds to step S122. At step S122, the length of the first period TM11 is changed such that the time integral value matches the design value. For example, if the time integral value is less than the design value, the first period TM11 is changed to become longer.

At step S123, following step S122, a decision is made as to whether the time integral value of the value (sweep current or sweep voltage) measured by the measurement section 120 in the second period TM12 matches a predetermined design value. The absolute value of the "time integral value of the value measured by the measurement section 120 in the second period TM12" corresponds to the area S2 shown in FIG. 6. Such a time integral value can be calculated by multiplying the second measurement value acquired at time point t291 in FIG. 3 by the length of the second period TM12. Alternatively, the second measurement value may be acquired a plurality of times in the second period TM12, to calculate the time integral value more accurately.

Furthermore, the "prescribed design value" referred to here signifies the above-described time integral value for the case in which the second measurement value matches the target value and the length of the second period TM12 corresponds to the original design value.

If the time integral value matches the design value, the processing sequence shown in FIG. 21 is ended without changing the length of the second period TM12. If the time integral value does not match the design value, the processing proceeds to step S124. At step S124, the length of the second period TM12 is changed such that the time integral value matches the design value. For example, if the time integral value is less than the design value, the second period TM12 is changed to become longer.

By executing the processing described above, the amount of charge accumulated in the gas sensor 200 in the first period TM11 and the amount of charge released from the gas sensor 200 in the second period TM12 can each be made to approach the design value. This enables the difference between the two to be reduced, and enables accurate measurement of the gas concentration. It should be noted that it would be equally possible to employ a form whereby only one of the set of processing steps S121 to S122 and the set of processing steps S123 to step S124 shown in FIG. 21 is executed, with the other being omitted.

As described above, the control section 110 of this embodiment changes the length of at least one of the first period TM11 and the second period TM12 such that that at least one of the time integral value of the values measured by the measurement section 120 in the first period TM11 and the time integral value of the values measured by the measurement section 120 in the second period TM12 matches the predetermined design value. The same effects as those described for the first embodiment can be obtained with this form also.

If the lengths of both the first period TM11 and the second period TM12 are changed, the mask setting section 140 changes the length of the mask period TM10 such that after the change, both the first period TM11 and the second period TM12 are included in the mask period TM10.

The present embodiment has been described above referring to specific examples. However, the present disclosure is not limited to these specific examples. Embodiments that have been appropriately modified in design by persons skilled in the art are also contained within the scope of the present disclosure, so long as the features of the present disclosure are included. The elements included in the above-described specific examples, and the arrangement, conditions, and shapes thereof are not limited to those illustrated, but may be appropriately modified. The elements included in the above-described specific examples may be appropriately changed, or altered in combination, so long as no technical contradiction arises.

The invention claimed is:

1. A control apparatus for a gas sensor that measures a gas concentration, the control apparatus comprising:
    a voltage application section that applies a voltage to the gas sensor, for measuring the impedance of the gas sensor;
    a control section that controls the operation of the voltage application section; and
    a sweep measurement section that measures at least one of a current that flows in the gas sensor and a voltage that is applied to the gas sensor, wherein:
    the control section performs
        a first control which, during a first period, operates the voltage application section such that a current flows through the gas sensor in a first direction, and
        a second control which, during a second period, operates the voltage application section such that a current flows through the gas sensor in a second direction that is opposite the first direction; and
    the control section changes the length of at least one of the first period and the second period based on a comparison between a first measurement value, which is the absolute value of a value measured by the sweep measurement section during execution of the first control, and a second measurement value, which is the absolute value of a value measured by the sweep measurement section during execution of the second control.

2. The control apparatus according to claim 1, wherein:
    in response to the first measurement value being greater than the second measurement value, the control section changes the length of the second period to become longer; and
    in response to the first measurement value being less than the second measurement value, the control section changes the length of the first period to become longer.

3. The control apparatus according to claim 1, wherein:
    in response to the first measurement value being greater than the second measurement value, the control section changes the length of the first period to become shorter; and
    in response to the first measurement value being less than the second measurement value, the control section changes the length of the second period to become shorter.

4. The control apparatus according to claim 1, wherein:
    in response to the first period or the second period being changed to become shorter, the sweep measurement section changes the timing at which measurement is performed.

5. The control apparatus according to claim 1, wherein:
    the application of a voltage by the voltage application section and the measurement of current or of voltage by the sweep measurement section are executed repetitively; and
    the control section changes the length of at least one of the first period and the second period in the next repetition, based on a comparison between the first measurement value and the second measurement value that are measured in the current repetition.

6. The control apparatus according to claim 1, further comprising:
    a mask setting section that sets, as a period that includes the first period and the second period, a mask period in which the measurement of the gas concentration by the gas sensor is temporarily halted,
    wherein the mask setting section changes the length of the mask period, in response to the length of at least one of the first period and the second period being changed.

7. The control apparatus according to claim 1, wherein:
    the control section changes the length of at least one of the first period and the second period in order to effect coincidence between the respective absolute values of the time integral value of a value measured by the sweep measurement section in the first period and the time integral value of a value measured by the sweep measurement section in the second period.

8. The control apparatus according to claim 1, wherein:
    the control section changes the length of at least one of the first period and the second period such as to effect coincidence between a prescribed set value and at least one of the time integral value of a value measured by the sweep measurement section in the first period and the time integral value of a value measured by the sweep measurement section in the second period.

9. The control apparatus according to claim 1, further comprising:
    a heater that heats the gas sensor; and
    a sensor temperature estimation section that estimates the temperature of the gas sensor based on the impedance of the gas sensor,
    wherein after the temperature which is estimated by the sensor temperature estimation section exceeds a prescribed temperature, the control section commences processing for changing the length of at least one of the first period and the second period.

10. The control apparatus according to claim 1, further comprising:
    a heater that heats the gas sensor, wherein
    after a prescribed interval has elapsed since the commencement of energization of the heater, the control section commences processing for changing the length of at least one of the first period and the second period.

11. The control apparatus according to claim 1 wherein:
    after application of a voltage by the voltage application section and measurement of current or of voltage by the sweep measurement section have each been repeated a plurality of times, the control section changes the length of at least one of the first period and the second period in next and subsequent iterations, based on a comparison between the average value of the first measurement values and the average value of the second measurement values.

12. The control apparatus according to claim 11, wherein:

in response to the average value of the first measurement values being greater than the average value of the second measurement values, the control section changes the length of the second period to become longer, in next and subsequent iterations; and in response to the average value of the first measurement values being less than the average value of the second measurement values, the control section changes the length of the first period to become longer, in next and subsequent iterations.

13. The control apparatus according to claim 11, wherein:

in response to the average value of the first measurement values being greater than the average value of the second measurement values, the control section changes the length of the first period to become shorter, in next and subsequent iterations; and in response to the average value of the first measurement values being less than the average value of the second measurement values, the control section changes the length of the second period to become shorter, in next and subsequent iterations.

14. The control apparatus according to claim 1, further comprising:

a temperature measurement section, wherein in response to the temperature measured by the temperature measurement section being changed, the control section executes processing for changing the length of at least one of the first period and the second period.

15. The control apparatus according to claim 1, wherein:

the control section executes processing for changing the length of at least one of the first period and the second period each time a prescribed interval has elapsed.

16. The control apparatus according to claim 1, wherein:

the application of a voltage by the voltage application section and the measurement of current or of voltage by the sweep measurement section are executed repetitively; and the control section executes processing for changing the length of at least one of the first period and the second period each time that the number of times of applying voltage by the voltage application section has reached a prescribed number of times.

* * * * *